United States Patent [19]

Hirata et al.

[11] Patent Number: 5,200,814
[45] Date of Patent: Apr. 6, 1993

[54] VIDEO PROJECTOR WITH OPTICAL COLOR BALANCE

[75] Inventors: Koji Hirata, Kamakura; Hiroki Yoshikawa, Hiratsuka; Takahiko Yoshida, Miura; Tooru Numata, Chigasaki; Masayuki Muranaka, Yokohama; Kiyoshi Wada, Yokohama; Isao Yoshizaki, Yokohama; Shigeru Inaoka, Yokohama, all of Japan

[73] Assignee: Hitachi, Ltd., Tokyo, Japan

[21] Appl. No.: 511,790

[22] Filed: Apr. 20, 1990

[30] Foreign Application Priority Data

Apr. 28, 1989 [JP] Japan .................................. 1-107605
Sep. 8, 1989 [JP] Japan .................................. 1-231599
Feb. 28, 1990 [JP] Japan .................................. 2-45384

[51] Int. Cl.$^5$ ............................................. H04N 9/31
[52] U.S. Cl. ............................................. 358/60; 358/55
[58] Field of Search .................................. 358/60, 55

[56] References Cited

U.S. PATENT DOCUMENTS 2,747,460  5/1956  Calvi ..................................... 358/60
3,004,099  10/1961 Harries ................................. 358/60
4,219,843  8/1980  Takahashi ........................ 358/60 X
4,300,156  11/1981 Boyd .................................. 358/60 X
4,454,535  6/1984  Machida ............................... 358/60

FOREIGN PATENT DOCUMENTS 2634612   1/1990  France .
59-205886 11/1984 Japan .
1-3946    1/1989  Japan .
1-170178  7/1989  Japan .

Primary Examiner—James J. Groody
Assistant Examiner—Mark R. Powell
Attorney, Agent, or Firm—Antonelli, Terry, Stout & Kraus

[57] ABSTRACT

Disclosed is a projection lens system for use in an optical system for magnifying and projecting original images displayed on plural image display devices onto a screen through projection lenses provided in corresponding relation to the image display devices, which projection lens system comprises plural lens elements and in which according to colors or degrees of fineness of original images, the number of constituent lenses, or the shape of lens surface, or an effective aperture of at least one constituent lens element surface, or the number of constituent lenses and the shape of lens surface, or the number of constituent lenses and an effective aperture of at least one constituent lens element surface, or the shape of lens surface and an effective aperture of at least one constituent lens element surface, or the number of constituent lenses, the shape of lens surface and an effective aperture of at least one constituent lens element surface, are changed at a time.

36 Claims, 15 Drawing Sheets

VIDEO PROJECTOR WITH OPTICAL COLOR BALANCE

BACKGROUND OF THE INVENTION

1. Field of the Invention

The present invention relates to a color display device using projection lenses such as a projection television device.

2. Prior Art

In a so-called projection television device wherein images on the fluorescent faces of cathode-ray tubes of blue, red and green are projected onto a screen through projection lenses, its focusing performance has recently made a remarkable advancement, and the requirements for the performance of projection lenses which are key devices are becoming more and more strict every year. Under the circumstances, various lenses have been made public according to the fineness of image. Even under the same design idea, various lenses of different numbers of constituent lenses and different shapes of lens faces have been designed. For example, projection lenses of this type are disclosed in Japanese Patent Laid-Open No. 10642787. In the conventional projection lenses referred to above, there has been attained a high focusing performance after appropriate aberration correction for light of designed wavelength. In many cases, e ray (546.7 nm) of a wavelength close to the main wavelength of a green phosphor is used as a designed central wavelength. In the prior art, since projection lenses designed for such green phosphor are used also for red and blue cathode-ray tubes, the design for red and blue projection is not optimal. Consequently, the reproduced color image is not the best image, either.

SUMMARY OF THE INVENTION

It is an object of the present invention to provide a color display device of a projection type having improved focusing performance.

It is another object of the present invention to provide a color display device of a projection type having improved brightness.

According to the present invention, in order to achieve the above-mentioned objects, there are provided optical projection devices for projecting images onto the same screen for a plurality of color image sources such as, for example, red, green and blue sources; at least two of the optical projection devices in such plural color image sources are made different in optical characteristics; and an optical projection device having the highest focusing performance is provided for the color image source of color (e.g. green) which is the highest in luminosity. In the present invention, moreover, an optical projection device which is the brightest (that is, whose F number is the lowest or effective lens surface diameter is the largest) is provided for the color image source of color (e.g. blue) of the lowest maximum luminance.

DESCRIPTION OF THE PREFERRED EMBODIMENTS

Figure 1:
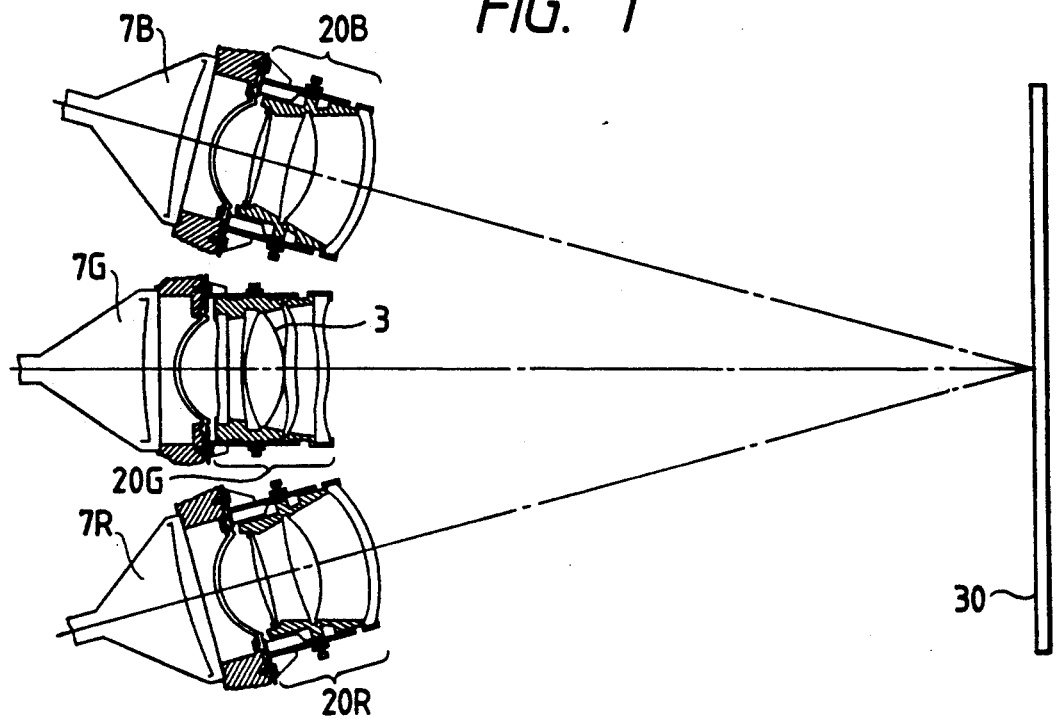
FIGS. 1 to 8 and 25 illustrate an embodiment of the present invention.
Figure 2:
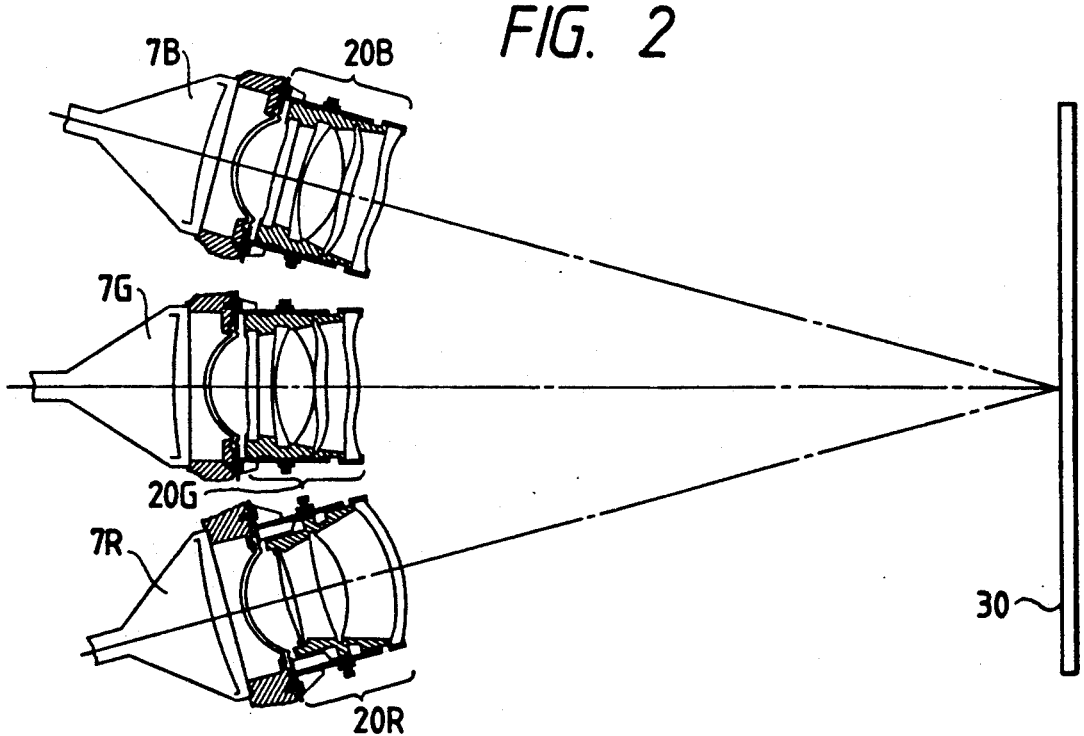

FIGS. 1 and 2 each illustrate an optical system including two kinds of projection lenses mounted together in a projection television device. In FIG. 1, a projection lens 20G provided in correspondence to a green cathode-ray tube 7G is of a five-group six-lens construction including a convex cemented doublet 3, while projection lenses 20B and 20R provided in correspondence to blue and red cathode-ray tubes 7B, 7R are of a four-group four-lens construction. The projection lenses shown in FIG. 3, whose lens data are shown in Tables 1(A) and 1(B), are on a larger scale of the projection lens 20G illustrated in FIG. 1. Likewise, the projection lenses shown in FIG. 4, whose lens data are shown in Tables 2(A) and 2(B), are on a larger scale of the projection lenses 20B and 20R illustrated in FIG. 1. Projection images projected through those projection lenses are combined on a screen 30.

Figure 10:
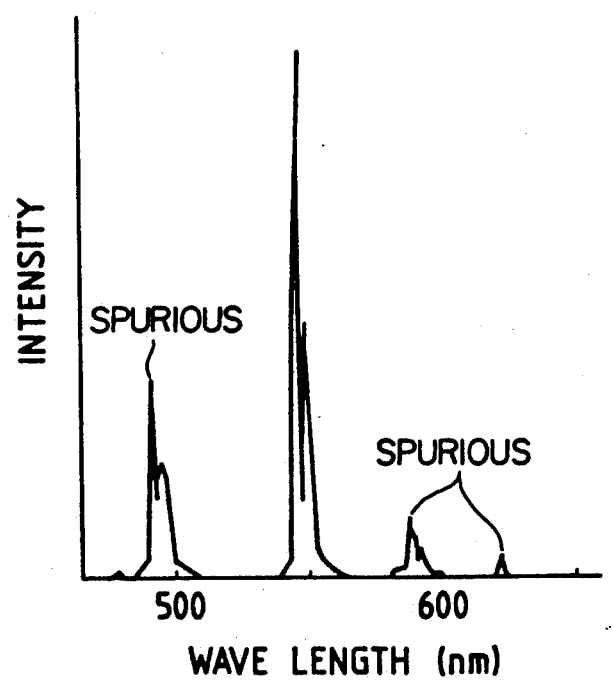
FIG. 10 is an emission spectral characteristic diagram of a green phosphor.
Figure 13:
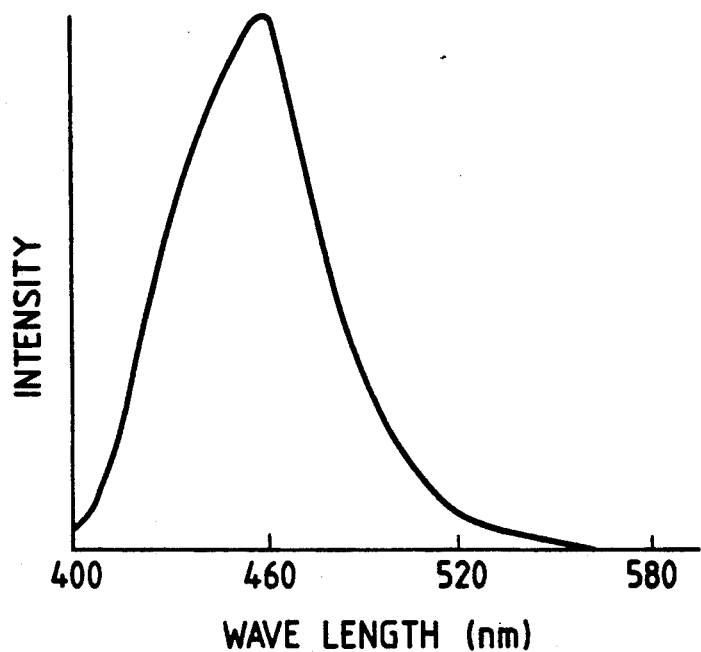
FIG. 13 is an emission spectral characteristic diagram of a blue phosphor.
Figure 14:
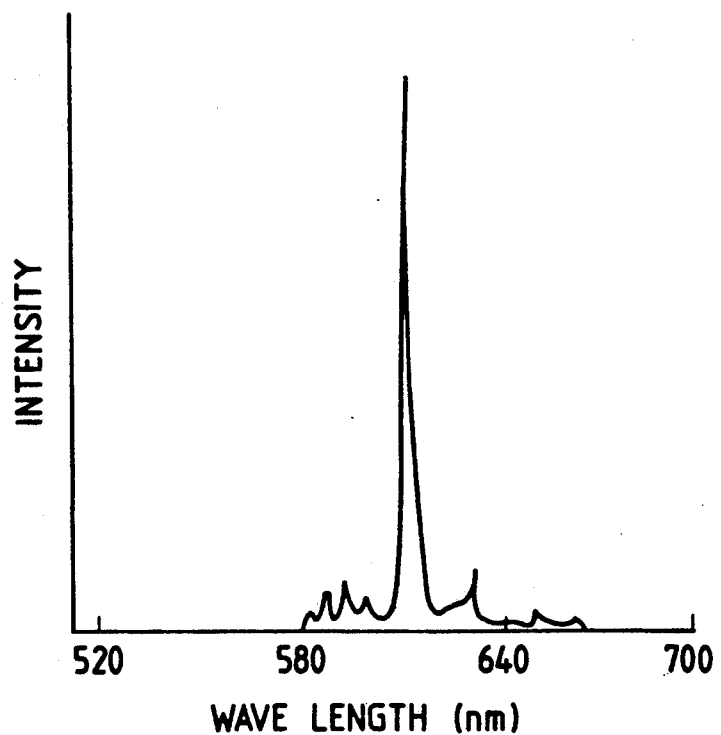
FIG. 14 is an emission spectral characteristic diagram of a red phosphor.
Figure 15:
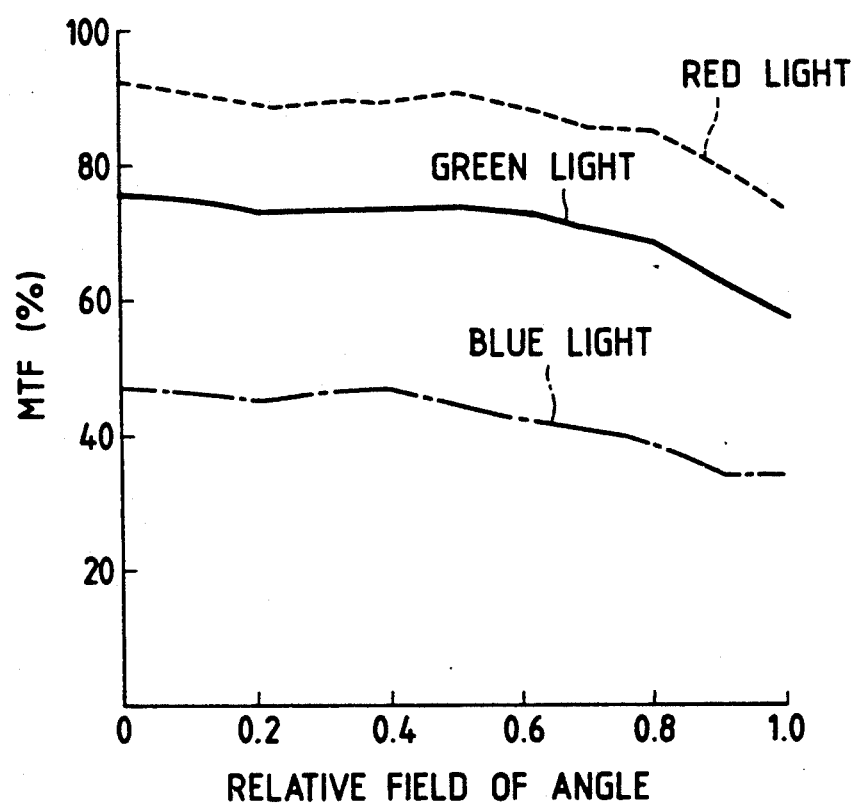
FIG. 15 is a characteristic diagram showing MTF characteristics of the projection lenses illustrated in FIG. 2.
Figure 25:
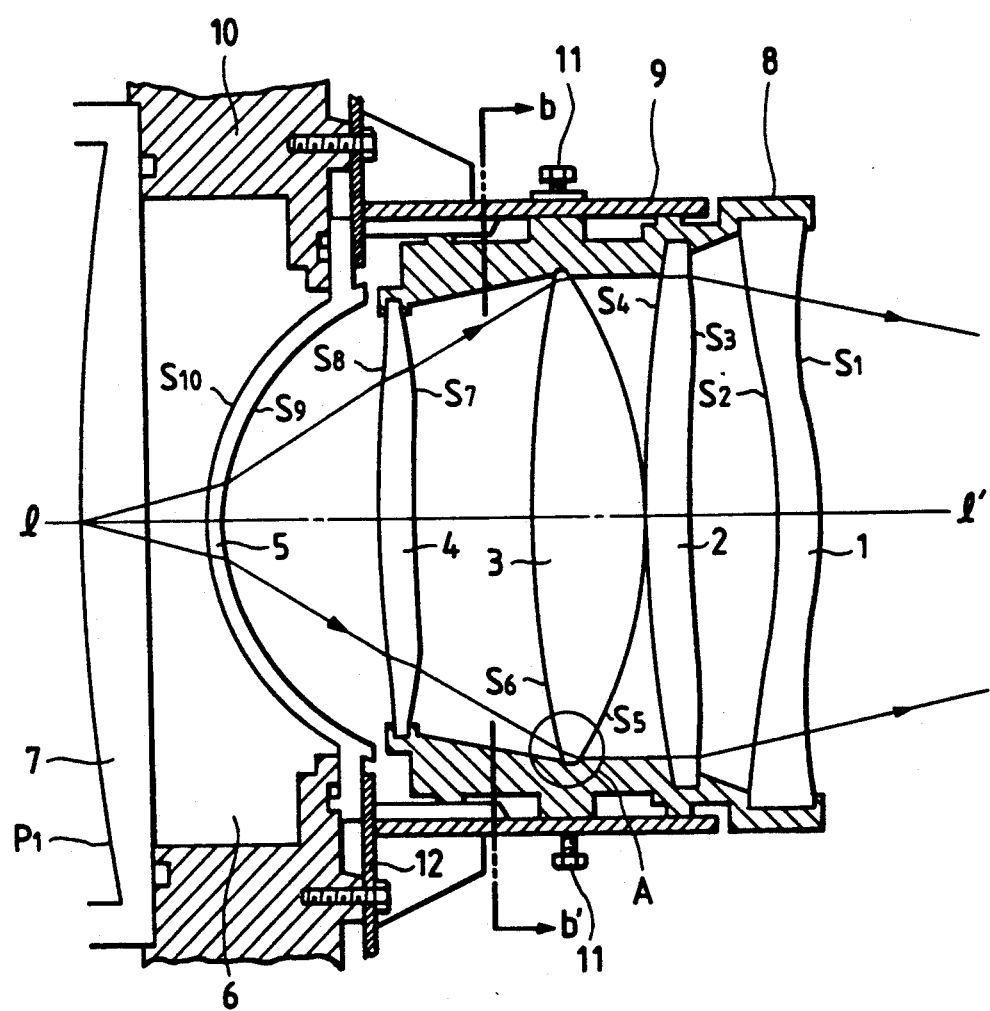

The reason why a convex cemented doublet is used as the third group lens 3 of the projection lens 20G corresponding to the green cathode ray tube 7G will now be stated. Generally, the focusing performance of a projection television device depends on the focusing performance of a green projection image which is the highest in luminosity. Since the emission spectrum of the phosphor used in the green cathode-ray tube has spurious wavelengths in addition to a main wavelength, as shown in FIG. 10, there occurs chromatic aberration even in the green projection image alone. To diminish this chromatic aberration, the third group lens 3 is constituted by a convex cemented doublet consisting of a concave lens 3b of high dispersion (low Abbe's number) and a convex lens 3a of low dispersion (high Abbe's number). As to the red projection image, chromatic aberration does not occur because the emission spectrum of the phosphor is of a short wavelength as shown in FIG. 14. On the other hand, as to the blue projection image, the emission spectrum of the phosphor covers a wide range of wavelength of emitted light as shown in FIG. 13 and the deterioration of the focusing performance caused by chromatic aberration is conspicuous, but since the luminance is the lowest among the three colors, the focusing performance in the three-color mixture is little influenced. In FIG. 15, MTF (Modulation Transfer Function) of 300 TV lines obtained by green, red and blue lights from the respective cathode-ray tubes utilizing conventional lenses was determined by calculation and sagittal-meridional averages are illustrated. It is seen that the foregoing tendency is exhibited. In the embodiment shown in FIG. 2, in order to attain both the improvement of brightness of the projection television device and the improvement of the focusing performance, th projection lenses 20G and 20B provided in correspondence to the green and blue cathode-ray tubes 7G, 7B each have a five-group six-lens construction using a convex cemented doublet, and the projection lens 20R provided in correspondence to the red cathode-ray tube 7R has a four-group four-lens construction. Generally, projection lenses can be made bright, low in F value, by increasing the number of constituent lenses. The projection lenses shown in FIG. 3, whose lens data are set forth in Tables 1(A) and 1(B), have an F value of 0.93. This is 15% brighter as compared with the F value of 1.0 of the projection lens shown in FIG. 4, whose lens data are set forth in Tables 2(A) and 2(B). Another method for improving the focusing performance and brightness will now be described. FIG. 25 is a sectional side view of the embodiment being considered, in which positions passing through constituent lenses of a light ray which determines the brightness of the picture plane center were determined by tracing the light ray and the results obtained are illustrated. The focusing performance can be improved by making small the effective aperture of lens surfaces $S_5$ and $S_6$ of the third group lens 3 which defines the image brightness. Thus, in this embodiment the effective lens aperture of the third group lens 3 is made small, but some lens construction has a different lens surface which determines the brightness of the image plane center. In this case, it goes without saying that the same effect is obtained by making small the effective aperture of another lens (e.g. a surface $S_4$ of a second group lens 2). On the other hand, brightness can be improved by enlarging the effective aperture of lens surface contrary to the method described above.

Figure 3:
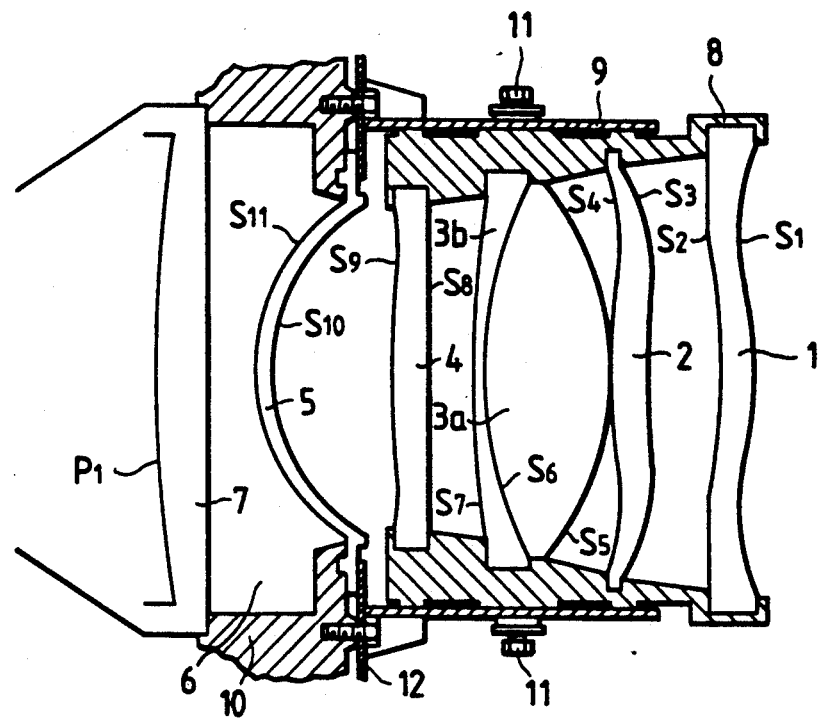
Figure 4:
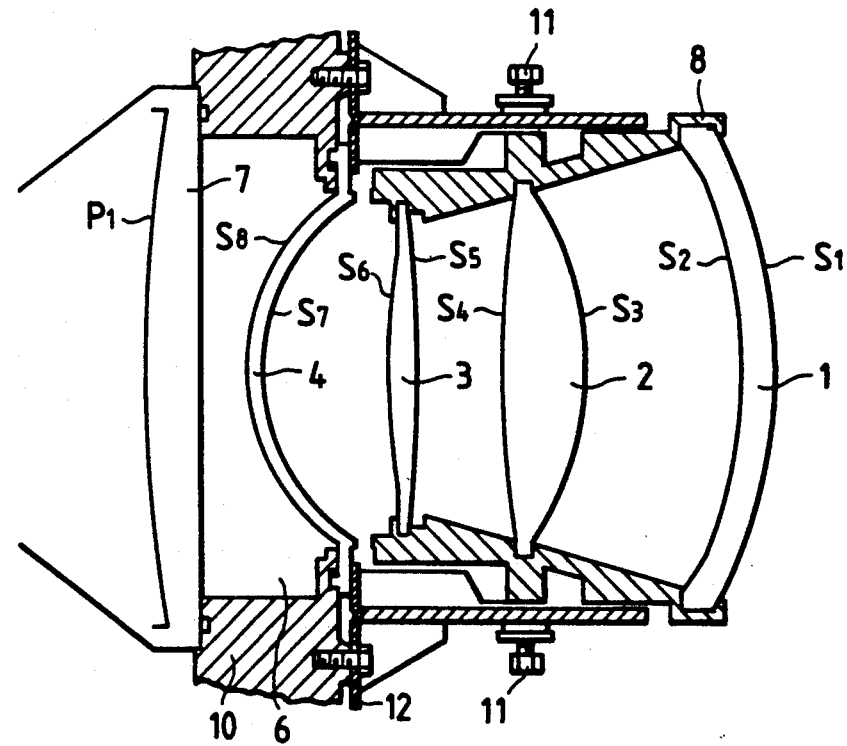

FIGS. 3, 5, 6, 7 and 8 are sectional views showing principal portions of lenses of optical systems for projection television. The lens construction shown in FIG. 4 is the same as that disclosed in a patent application filed Apr. 29, 1988 (Ser. No. 188,482) now U.S. Pat. No. 4,948,237. In FIG. 3, $P_1$ denotes the fluorescent face of a cathode-ray tube; numeral 7 denotes a panel of the cathode-ray tube; numeral 6 denotes a cooling liquid; numeral 5, a fifth group lens; numeral 4, a fourth group lens; numeral 3, a third group lens; numeral 2, a second group lens; and numeral 1, a first group lens. An inner barrel 8 in which are incorporated the first lens 1 to the fourth lens 4 is positioned and fixed to an outer barrel 9 with fixing bolts 11. The outer barrel 9 is fixed with bolts to a bracket 10 through a fixing plate 12. The optical system of this embodiment is constructed so that the best performance is obtained when a 5.4 inch raster on the CRT fluorescent face is magnified and projected onto a screen. The magnification in such magnified projection is 8.4X in the case of the lens data shown in Tables 1(A), 1(B) and Tables 2(A), 2(B), and it is 9.3 X in the case of the lens data shown in Tables 3 to 7. The field angle of lens is 72° in the example shown in Tables 1 and 2, while it is 78° in the example shown in Tables 3 to 7. In both cases, high field angles are realized, and even where only one turn-up mirror 14 is used as shown in 9, it is possible to realize a sufficiently compact set. The first group lens 1 is of an aspherical shape for eliminating spherical aberration based on the lens aperture. The second group lens 2 is of an aspherical shape for eliminating astigmatism and coma aberration. The third group lens 3 is constituted by a glass lens and has as large a power as possible in order to diminish focus drift caused by changes of temperature. The fourth group lens, for eliminating coma aberration of a high order, has an aspherical shape and has as small a power as possible. The fifth group lens is a lens for the correction of curvature of image field, having an aspherical surface at its air-side interface for the correction of an off-axis sagittal aberration. The CRT fluorescent face $P_1$ has a curvature for the correction of an image field curvature. In particular, if the fluorescent face $P_1$ is made aspherical for correcting an image field curvature of a high order, it will become possible to effect a more accurate correction.

Generally, the fluorescent face $P_1$ of the CRT panel 6 is formed by pressing and not subjected to a post-processing. Therefore, no matter whether its shape after pressing is spherical or aspherical, the manufacturing method itself does not change.

On the other hand, the other lenses than the third group lens are constituted by plastic lenses and are designed to minimize power, whereby they are thinned. Besides, the formability is improved by reducing the difference in wall thickness between the central portion and the peripheral portion.

Figure 11:
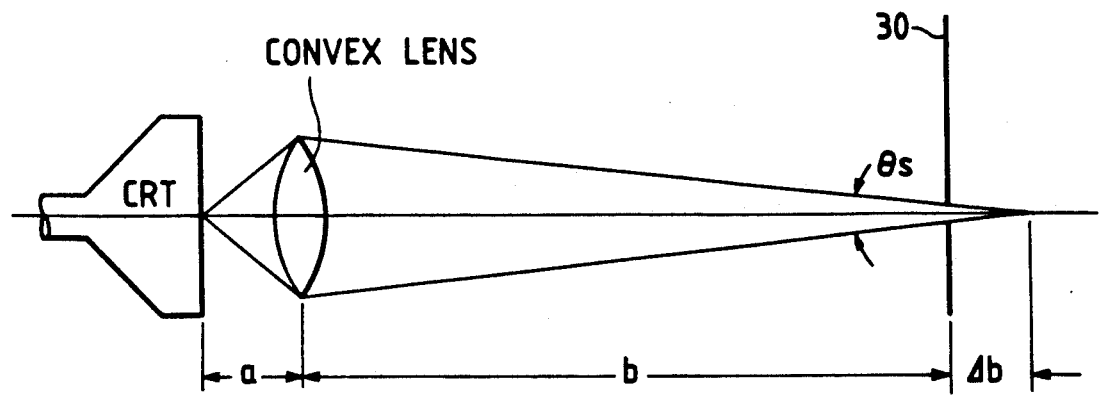
FIGS. 11 and 12 are views explanatory of the present invention.

Conventional projection lenses range in focal length from 100 mm to 140 mm, while in the embodiment of the invention the focal length of an entire projection lens system is about 80 mm as shown in Table 8 and thus the reduction of chromatic aberration is realized. The following description is now provided about diminishing chromatic aberration by making the focal length short with reference to drawings. FIG. 11 is a longitudinal sectional view for explaining the reduction of an on axis chromatic aberration. Assuming that the projection lens is a single thin-walled lens of a focal length f, and that the fluorescent face—lens spacing and the lens—screen spacing are a and b, respectively, the following imaging equation is given:

$$\frac{1}{a} + \frac{1}{b} = \frac{1}{f} \quad (1)$$

If the radii of curvature of both surfaces of the lens are $r_1$ and $r_2$, $$\frac{1}{f} = (N - 1)\left(\frac{1}{r_1} - \frac{1}{r_2}\right) \quad (2)$$

$$\frac{\Delta f}{f} = \frac{1}{N - 1} \cdot \Delta N \quad (3)$$

The increase of the spot diameter, $\Delta d$, is given by the following equation using F number and magnification M:

$$\Delta d = \Delta b \cdot \theta_s \approx \frac{\Delta b}{F \cdot M} \quad (4)$$

From the equations (1)–(4):

$$\Delta d = \frac{(1 + M)^2 \cdot f}{F \cdot M} \cdot \frac{\Delta N}{N - 1} \quad (5)$$

And:

$$M \cdot f \approx b \ldots \quad (5)$$

Figure 12:
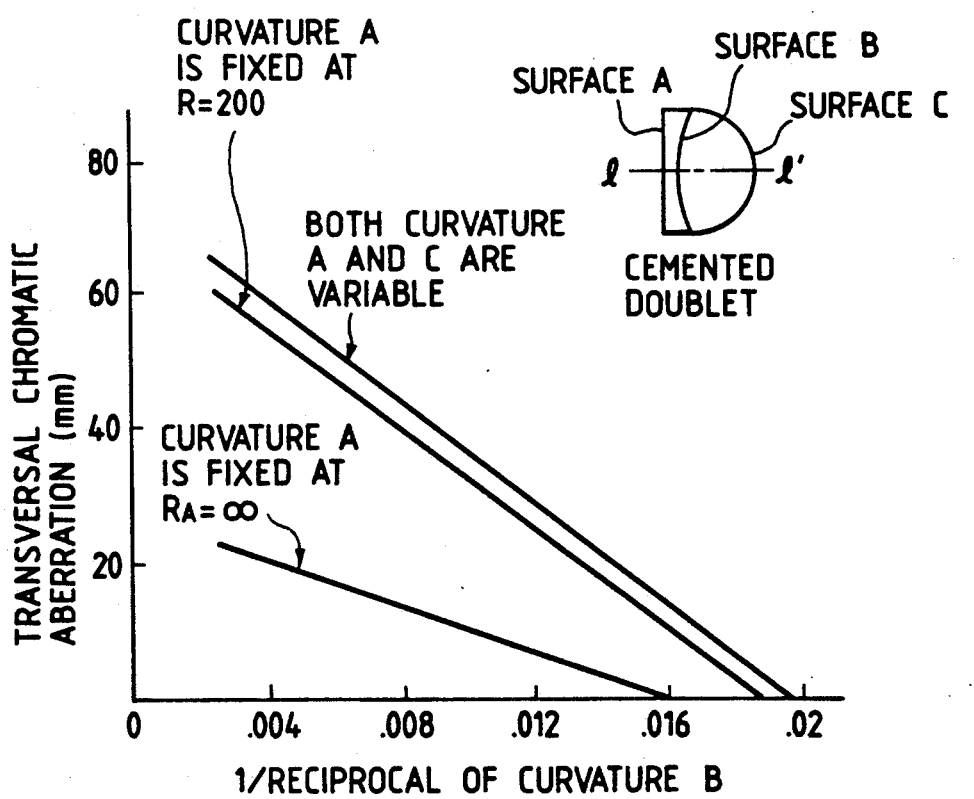

Thus, the increase of the spot diameter, $\Delta d$, due to chromatic aberration is proportional to the focal length f. In addition to the reduction of chromatic aberration described above, the third group lens 3 in this embodiment is constituted by a cemented doublet consisting of lenses 3a and 3b. The lens 3b shown in Tables 1, 3(C), 4(C), 5(C) and 6 is a concave lens made of a high dispersion material, while the lens 3a is a convex lens made of a low dispersion material. Chromatic aberration is diminished by cementing the two together. FIG. 12 shows the results of calculation made about a longitudinal chromatic aberration which occurs in the projection lens described above. In the coordinates of a sectional side view of the lens shown in the same figure, if in the optical axis of the lens, 1, 1', the direction from 1 to 1' is a positive direction, the radius of curvature of the surface B has a positive sign because the radius of curvature is assumed to be positive when the center lies in the positive direction. The axis of abscissa in FIG. 12 represents the reciprocal of the radius of curvature of the cemented surface B, and from this figure it is seen that a longitudinal chromatic aberration can be diminished by making small the radius of curvature of the surface B. However, making small the radius of curvature of the surface B results in increase in the amount of sag at the outermost peripheral portion. Consequently, if a marginal portion of the lens is ensured, the convex lens becomes very large in its wall thickness. For this reason, the radius of curvature of the surface B cannot be made so small. In the case where the radius of curvature of the surface B is fixed, as is apparent from FIG. 12, the action of the concave lens is enhanced and the chromatic aberration correcting ability is greatly improved by making the surface A, namely the CRT-side face, planar or convex (not shown) on the screen side rather than making it convex on the CRT side. In the projection lenses used in the present invention, chromatic aberration can be diminished to a great extent by making the CRT-side surface of the foregoing concave lens of high dispersion planar or convex on the screen side. Possible concrete lens data of the projection lenses of the present invention described above are as shown in Tables 1 and 3 to 7. How to read these lens data will now be explained with reference to Table 1(A). Table 1(A) shows data dividedly to those in a spherical system which mainly covers the lens are near the optical axis and those in an aspherical system which covers the outer peripheral portion. According to this table, the radius of curvature of the screen is $\infty$ (i.e. plane); the distance (space between faces) on the optical axis from the screen to the surface $S_1$ of the first lens group 1 is 787.6 mm; and the refractive index of the medium (air) in that distance is 1.0. It is also shown therein that the radius of curvature of the surface $S_1$ of the first lens group 1 is 97.999 mm (the center of curvature is on the fluorescent face side), that the spacing (space between faces) on the optical axis between the lens surfaces $S_1$ and $S_2$ is 8.874 mm, and that the refractive index of the medium in that spacing is 1.49334. Further data are shown likewise, and lastly it is shown that the radius of curvature of the fluorescent face Pl of the CRT panel 7 is 341.28 mm, that the thickness on the optical axis of the CRT panel 7 is 13.4 mm, and that the refractive index is 1.53983. Next, in Table 1(B) there are shown aspherical coefficients with respect to the surfaces $S_1$, $S_2$ of the first group lens 1, the surfaces $S_3$, $S_4$ of the second group lens 2, the surfaces $S_8$, $S_9$ of the fourth group lens 4, the surface $S_{10}$ of the fifth group lens 5, and the fluorescent face $P_1$. The aspherical coefficients as referred to herein indicate coefficients obtained when the face shape is expressed by the following equation:

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

Figure 16:
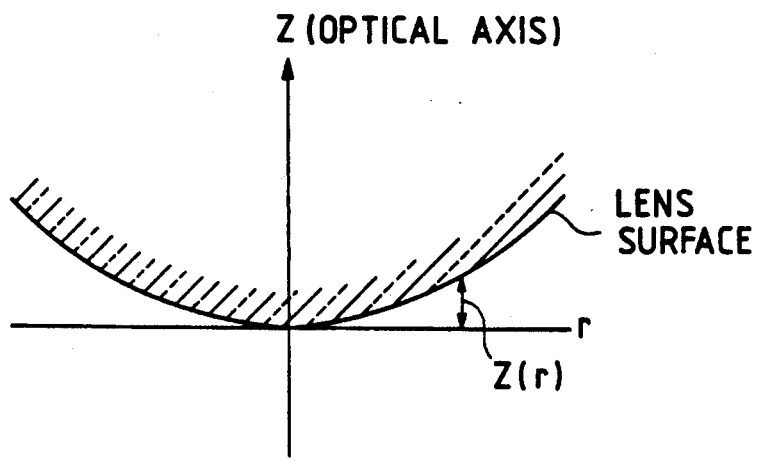
FIGS. 16 and 17 are explanatory views for the definition of the lens shape.
Figure 17:
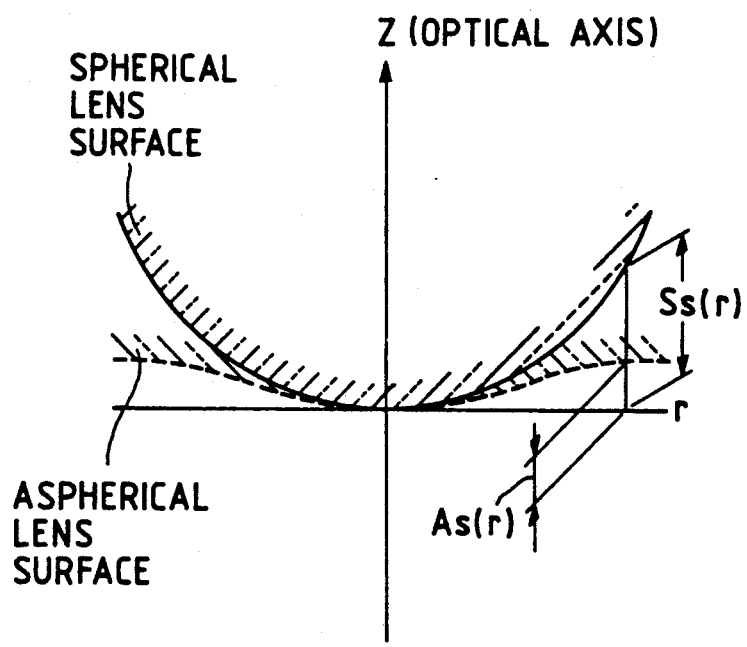

In the above equation, Z represents the height (relation of r) of the lens surface when the optical axis direction is plotted along Z axis and the radial direction of the lens is plotted along r axis; as shown in FIGS. 16 and 17; r represents a radial distance; and $R_D$ represents a radius of curvature. Therefore, once the coefficients CC, AE, AF, AG and AH are given, the lens surface height, that is, the shape, is determined in accordance with the above equation. FIG. 17 is a view explanatory of aspherical surface. By substituting into the above aspherical terms the respective values there is obtained a lens surface which is deviated by $S_{x(r)} - A_{x(r)}$ from the lens surface in the spherical system alone. The surface $S_{11}$ of the fifth group lens 5 in Table 1 indicates that all of the aspherical coefficients are zero and the lens surface is spherical. The method of reading the data shown in Tables 1(A) and 1(B) is as described above. Tables 2 to 7 show concrete examples of other lens data. Tables 3(C), 4(C) and 5(C) show lens data on the case where cemented convex doublet consisting of a concave lens of high dispersion and a convex lens of low dispersion is used as the third group lens 3 shown in the respective tables (A). According to the projection lenses of the present invention, as is apparent from those tables, a high focusing performance can be attained without change in shape of the first, second, fourth and fifth group correction lenses even in the case where the convex glass lens as the third group lens 3 is changed to the cemented convex lens of concave and convex lenses.

Figure 5:
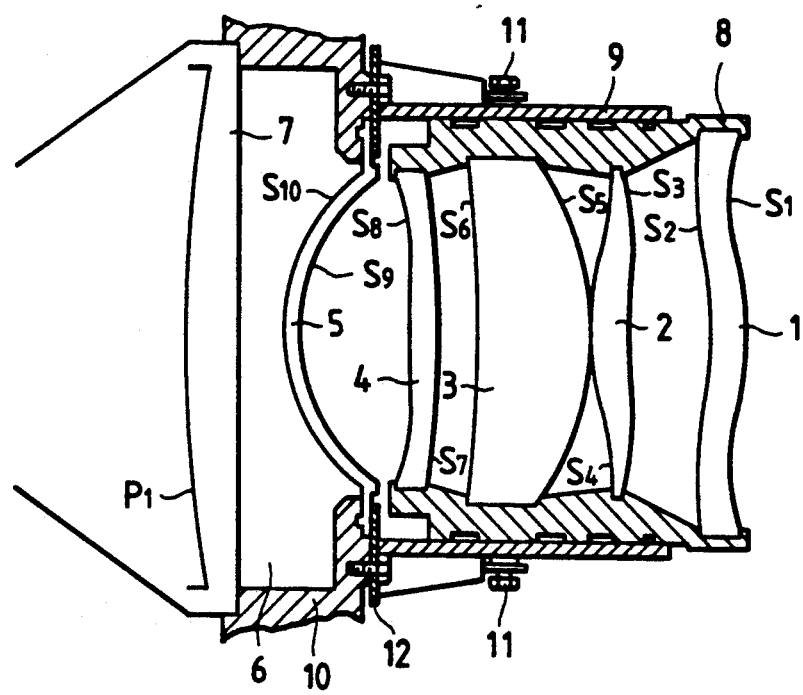
Figure 6:
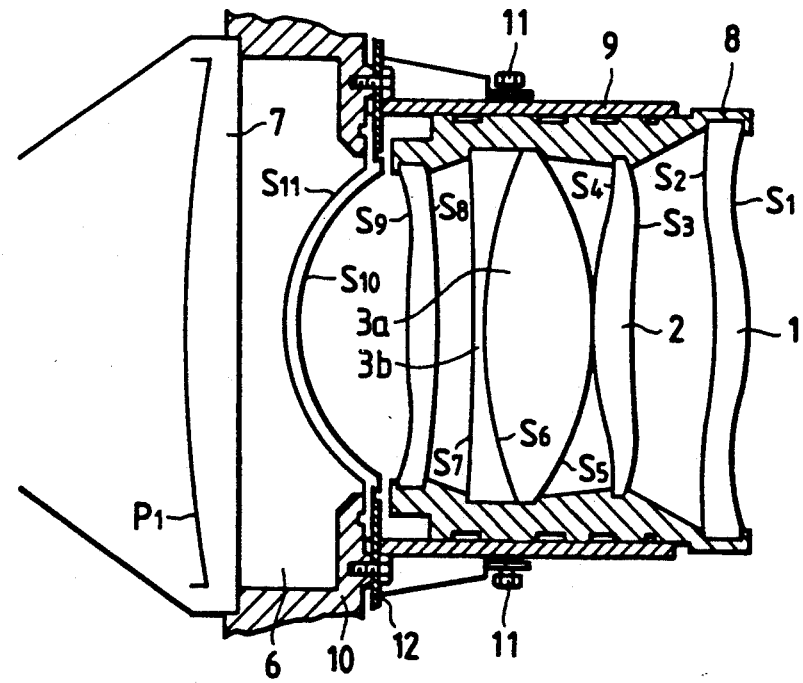

FIG. 1 is a sectional side view of projection lenses corresponding to the lens data of Tables 1(A) and 1B, and FIG. 2 is a sectional side view of projection lenses corresponding to the lens data of Tables 2(A) and 2(B). Further, FIGS. 7 and 8 correspond to Tables 7 and 6, respectively. The fifth group lenses 5 used in both examples are of the same shape and thus a common use of constituent lens is realized. FIG. 5 is a sectional side view of projection lenses corresponding to the lens data of Tables 3(A) and 3(B), and FIG. 6 is a sectional side view of projection lenses corresponding to the lens data of Tables 3(B) and 3(C).

FIGS. 18 to 24 shows the results of evaluation on the focusing characteristic based on MTF (Modulation Transfer Function) obtained when a 5.4 inch image on the fluorescent face is projected magnifiedly onto the screen, using the projections lenses of the present invention described above. The phosphor emission spectrum shown in FIG. 10 was used.

Figure 18:
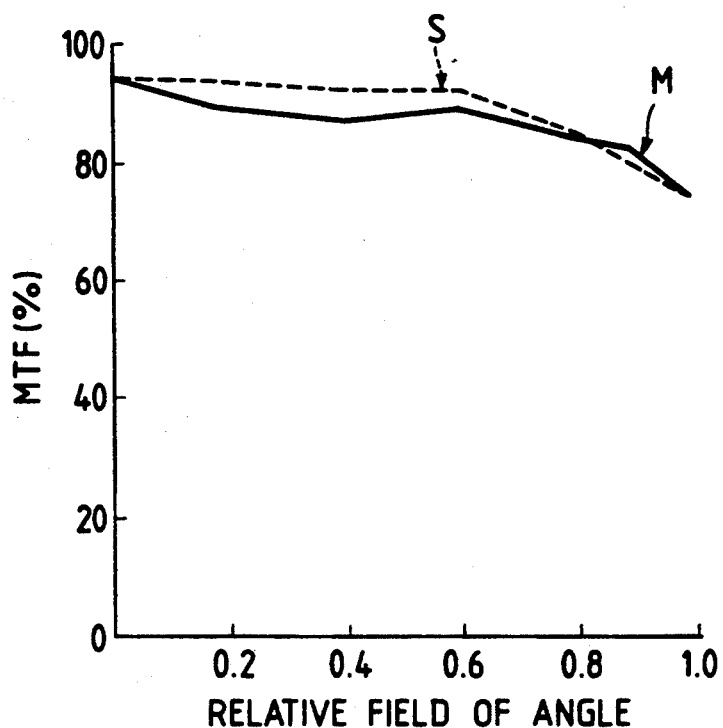
FIGS. 18 to 24 are characteristic diagrams showing MTF characteristics of the projection lenses embodying the present invention.
Figure 19:
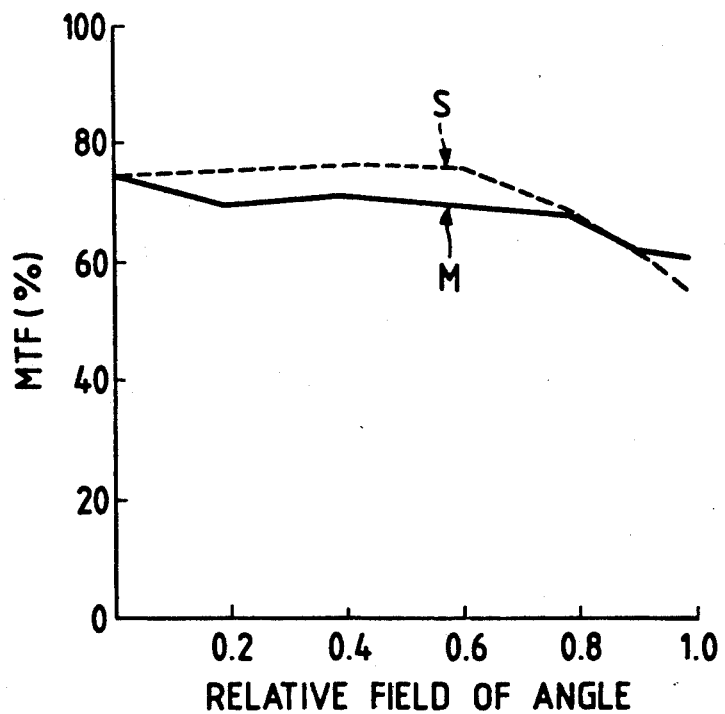
Figure 20:
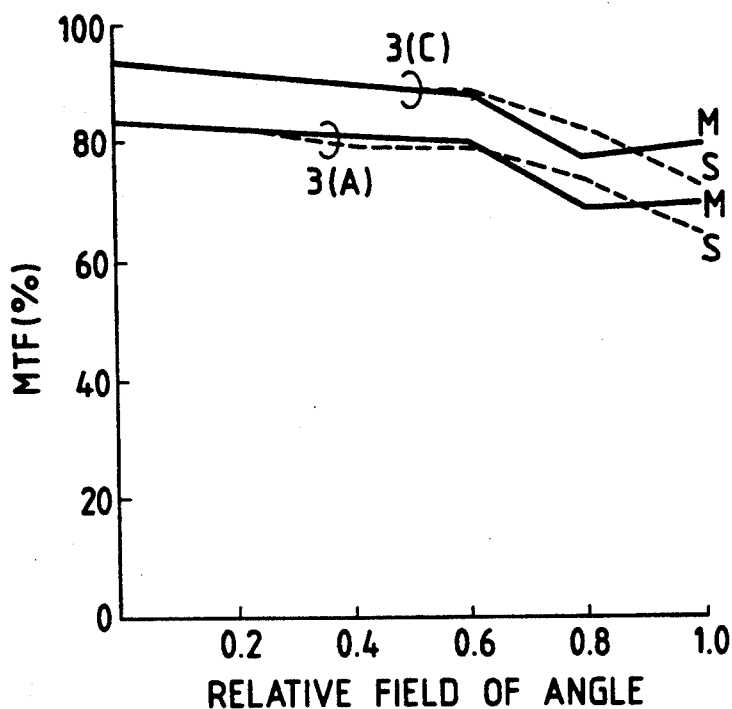
Figure 21:
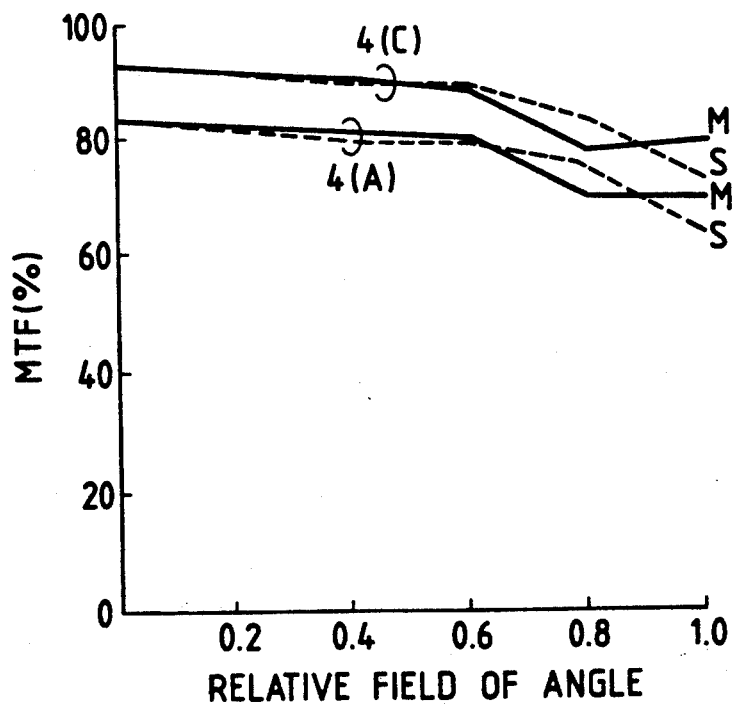
Figure 22:
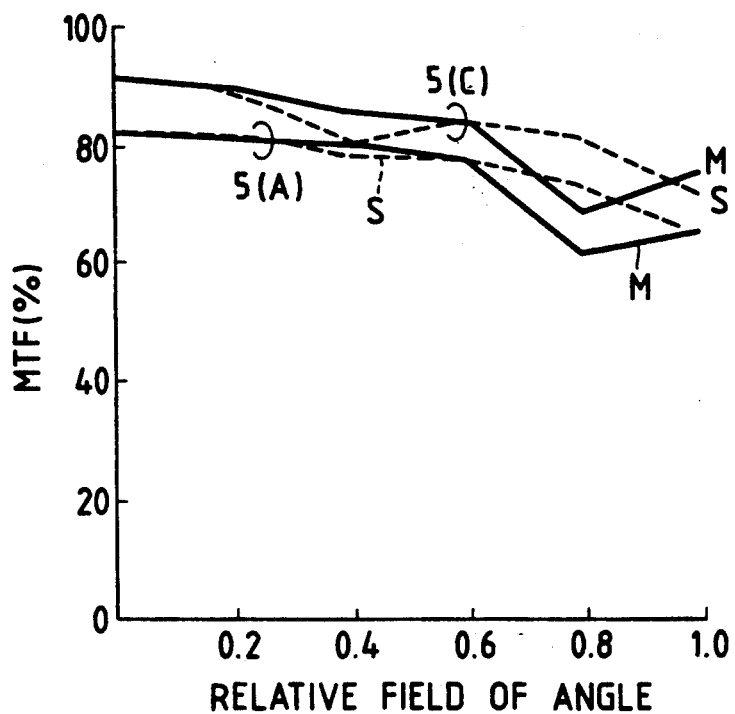
Figure 23:
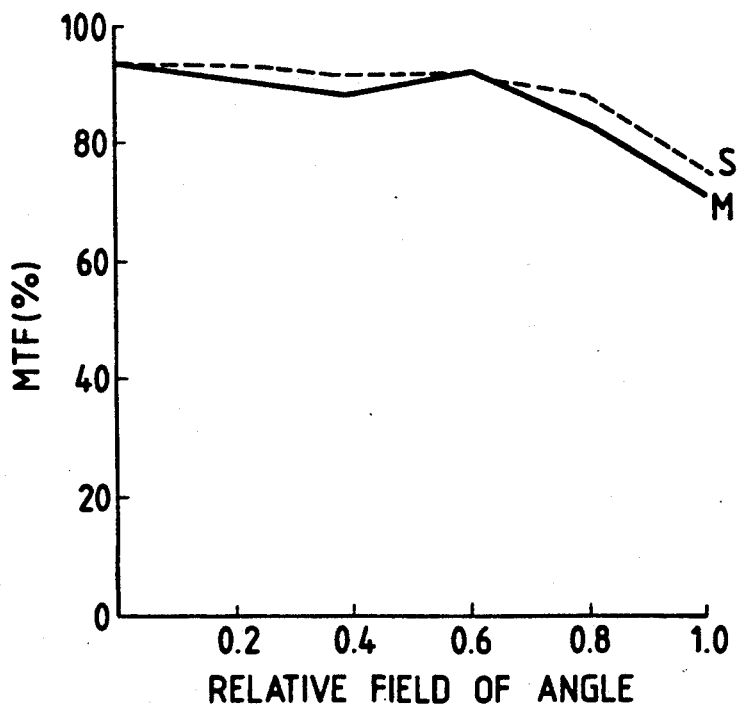
Figure 24:
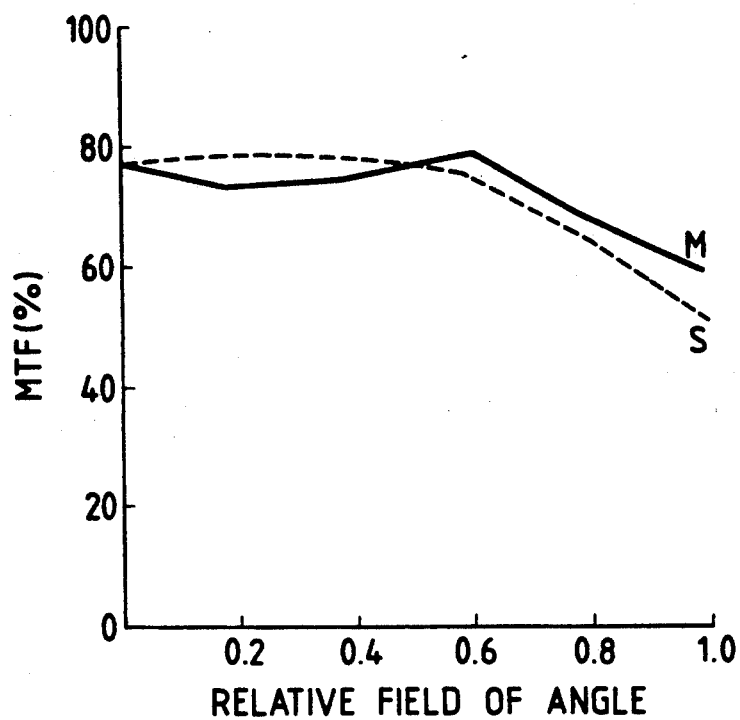

FIG. 18 is a characteristic diagram corresponding to Tables 1(A) and 1(B); FIG. 19 is a characteristic diagram corresponding to Tables 2(A) and 2(B); FIG. 20, 3(A) and 3(C) are characteristic diagrams corresponding to Tables 3(A), (B) and Tables 3(B), (C), respectively; FIG. 21, 4(A) and 4(C) are characteristic diagrams corresponding to Tables 4(A), (B) and 4(B), (C), respectively; and FIG. 22, 5(A) and 5(C) are characteristic diagrams corresponding to Tables 5(A), (B) and 5(B), (C), respectively. In the illustrated case, 300 TV lines are taken as black and white stripe signals. It is seen that good MTF characteristics are shown in FIGS. 18 and 20 to 24.

Further, from comparison between (A) and (C) in each of FIGS. 20, 21 and 22 it is seen that a focusing performance improving effect is attained by the use of the cemented convex double consisting of concave and convex lenses of high and low dispersion, respectively. In the examples shown in Table 1 and Tables 3 to 7, if the focal length of the entire system is $f_0$ and the focal lengths of the first to fifth group lenses 1, 2, 3, 4, 5 are $f_1$, $f_2$, $f_3$, $f_4$ and $f_5$, respectively, there exist the relationships shown in Table 8, namely:

$$0.14 < f_0/f_1 < 0.22$$
$$0.02 < f_0/f_2 < 0.25$$
$$0.63 < f_0/f_3 < 0.83$$
$$0.21 < f_0/f_4 < 0.31$$
$$-0.57 < f_0/f_5 < -0.50$$

In this embodiment, most of the positive refractive power of the entire lens system is obtained by the third group lens 3 which is a glass lens, whereby the temperature drift of focus is diminished. Also when a common use of other lenses is considered, the above method is desirable.

Now, the shape of lens surface will be explained. The following can be said about the aspherical shapes of the screen-side lens surface $S_1$ of the first group lens 1, the second group-side lens surface $S_2$ thereof, the first group-side lens surface $S_3$ of the second group lens 2, the third group-side lens surface $S_4$ thereof, the third group-side lens surface $S_8$ ($S_7$ in FIGS. 5 and 7) of the fourth group lens 4 and the fifth group-side lens surface $S_9$ ($S_8$ in FIGS. 5 and 7) of the fourth group lens 4. Explanation will be given below with reference to FIG. 17.

FIG. 17 is an explanatory view showing an aspherical lens shape. When the optical axis direction is plotted along Z axis in the radial direction of the lens, if the height of lens surface is of a spherical system or $R_D$ alone and if the substitution of the aspherical coefficients CC, AE, AF, AG and AH into the equation (1) is expressed by As(r), the following relationship exists, as shown in Table 9, as the $A_{s(r)}$ to $S_{s(r)}$ ratio of the screen-side lens surface of the first group lens 1 if the clap radius is substituted into r:

$$-0.08 < A_s/S_s < 0.05$$

Likewise, as to the second greens Surface of the first group lens 1, the following relationship exists:

$$0.20 < A_s/S_s < 0.52$$

As to the first group-side lens surface of the second group lens 2, the following relationship is valid, as shown in Table 10:

$$-1.26 < A_s/S_s < 0.06$$

Similarly, as to the third group-side lens surface of the second group lens 2, the following relationship is valid:

$$-0.07 < A_s/S_s < 1.16$$

Further, as to the third group-side lens surface of the fourth group lens 4, the following relationship holds good, as shown in Table 11:

$$-3.29 < A_s/S_s < 5.19$$

Likewise, as to fifth group-side lens surface of the fourth group lens 4, there exists the following relationship:

$$-1.58 < A_s/S_s < 0.21$$

As to the ratio of the space between faces $l_{23}$, of the first and second group constituent lenses to the focal length $f_0$, of the entire projection lens system, there exists the following relationship, as shown in Table 12:

$$0.15 < l_{23}/f_0 < 0.25$$

In order to ensure a relative illumination while maintaining the focusing performance, it is necessary to satisfy the following relationship:

$$0.15 < l_{23}/f_0$$

But the following relationship is desired because as the above ratio becomes higher, the quantity of light in the middle area of the picture plane tends to decrease:

$$l_{23}/f_0 < 0.25$$

Further, as to the ratio of the space between faces $l_{23}$, of the first and second group constituent lenses to that $l_{45}$, of the second and third group constituent lenses, the following relationship exists, as shown in Table 12:

$$23.0 < l_{23}/l_{45} < 40.0$$

Preferably, the following relationship should be satisfied in order to ensure the marginal thickness of lens while suppressing the amount of sag of the first group-side lens surface of the second group lens 2:

$$l_{23}/l_{45} < 40.0$$

On the other hand, in the case where the brightness of the picture plane center is ensured and the above value is made small, it is necessary to increase the effective aperture of the second group lens 2. For this reason, it is desirable to satisfy the following relationship:

$$23.0 < l_{23}/l_{45}$$

As to the ratio of the space between faces $l_{910}$, of the fourth and fifth group constituent lenses to that $L_0$, of the fluorescent face and the third group constituent lens, there exists the following relationship, as shown in Table 13:

$$0.32 < l_{910}/L_0 < 0.39$$

In order to increase the quantity of light Of the picture plane periphery while maintaining the focusing performance, it is desirable to satisfy the following relationship:

$$l_{910}/L_0 < 0.39$$

Further, as to the ratio of the space between faces $l_{78}$, of the third and fourth group constituent lenses to the above $l_{910}$, the following relationship is satisfied:

$0.35 < l_{78}/l_{910} < 0.79$

For improving the focusing performance, the following relation is desired:

$0.35 < l_{78}/l_{910}$

But a value of the above ratio exceeding 0.79 is not desirable because the relative illumination will be decreased.

Next, as to the shape of the fluorescent face, it is aspherical as shown in Tables 1 to 7, and the center of curvature thereof lies on the screen side. The radius of curvature is larger at the peripheral portion than at the central portion.

Figure 7:
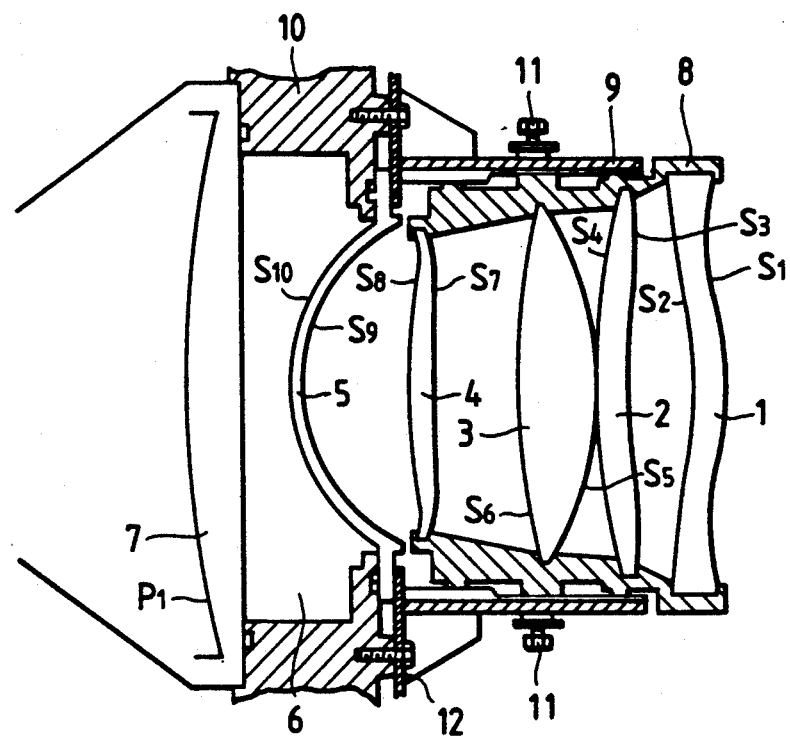
Figure 8:
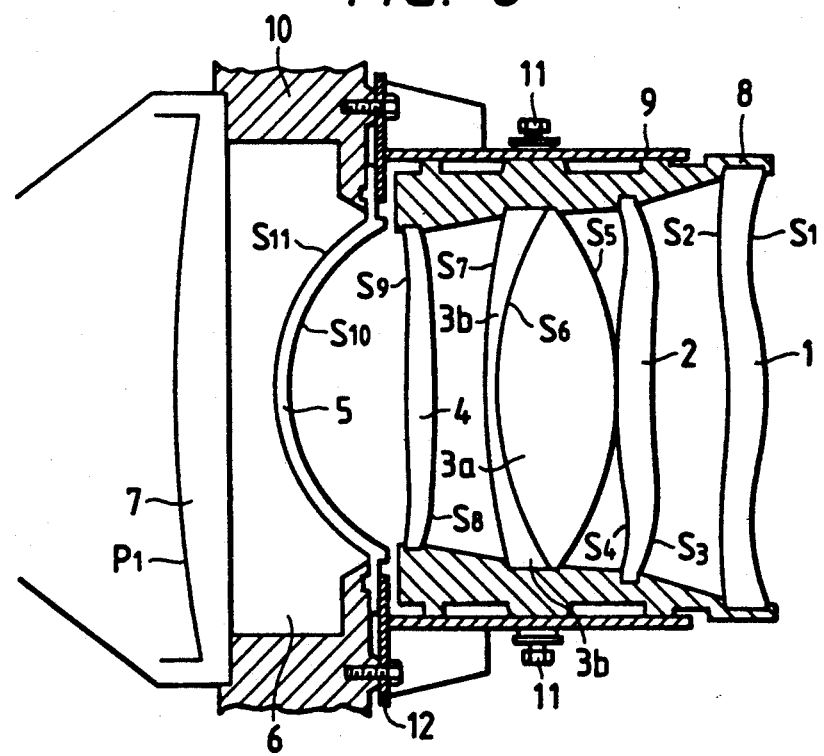

FIG. 7 illustrates the arrangement of conventional optical parts of a projection type television, which parts are a turn-up mirror 14, projection lenses 15, a cathode-ray tube 16 and a screen 13.

Figure 9:
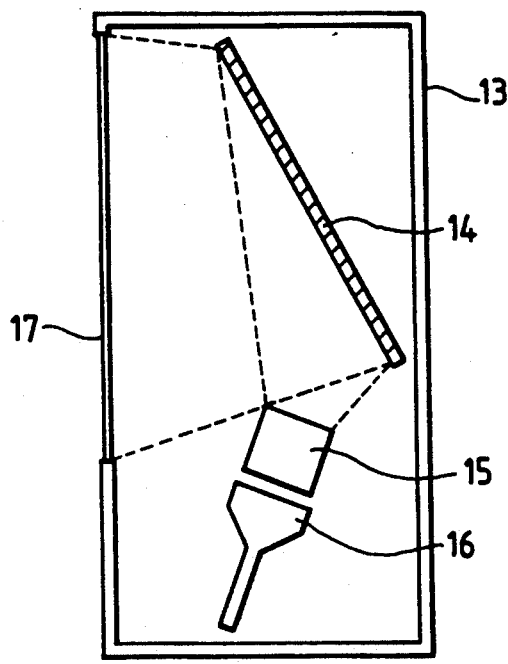
FIG. 9 is a longitudinal sectional view showing a projection television device using projection lenses according to the present invention.

In the projection lenses of the present invention, the focal length in 45-inch projection is 787.6 mm and that in 50-inch projection is 790.0 mm, thus are sufficiently short. And as shown in FIG. 9, with only one turn-up mirror, it is possible to attain a compact construction of the set.

Features of the present invention has been described above on the basis of the lens data.

Now, concrete constructions for changing the brightness using the same barrel will be described with reference to FIGS. 25, 26, 27 and 28. FIG. 25 is a sectional side view embodying the present invention, in which two solid lines with arrows indicate heights at which upper and lower limit rays of light emitted from an object point on the optical axis ll' pass through the constituent lenses, the said heights having been obtained by tracing the light rays. In this embodiment, the brightness is determined according to the effective diameter of the fluorescent face-side lens surface $S_6$ of the third group lens 3.

FIG. 26 is an enlarged view of portion A in FIG. 25. For changing the effective lens aperture, a groove 19 is formed in a clap 18, and the clap 18 is cut off or folded off for enlarging the effective aperture.

Figure 26A:
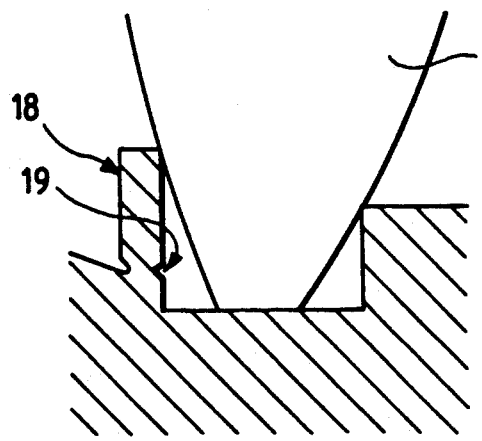
FIGS. 26, 27 and 28 are views each showing a lens fixing portion of a lens barrel according to the present invention.
Figure 26B:
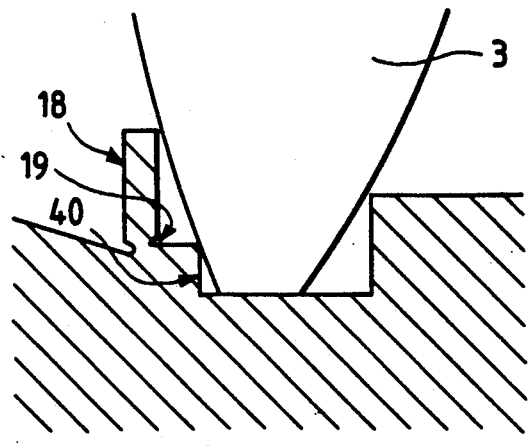

In FIG. 26(a), a part of the clap is cut off and the third group lens 3 is held and fixed by the remaining portion, while in FIG. 26(b), the whole of the clap is cut off, in which the fixing of the third group lens 3 is effected by a slot 40 formed in the lens barrel.

Figure 27A:
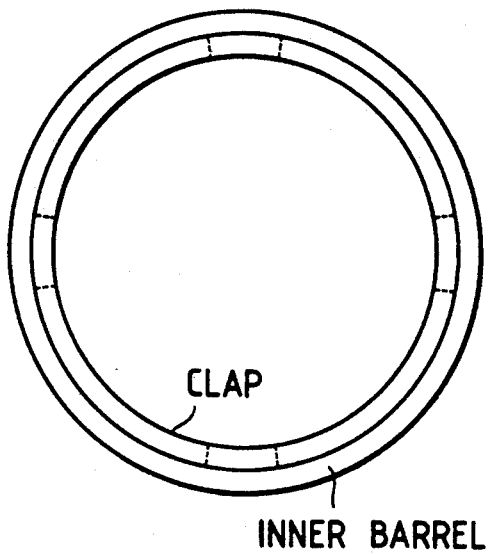
Figure 27B:
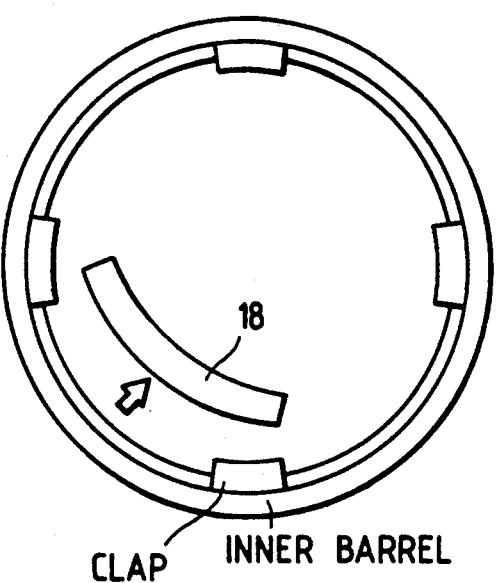
Figure 28A:
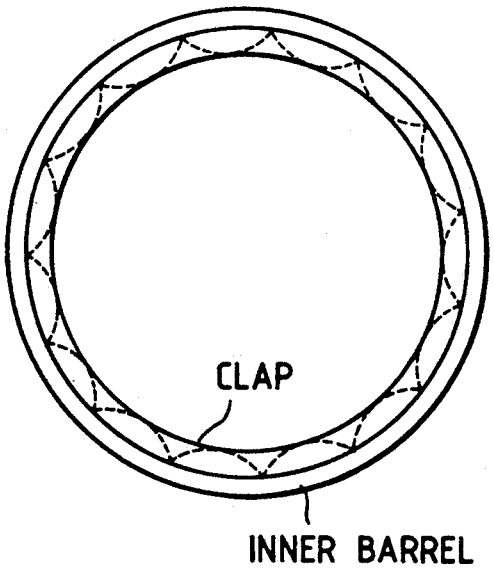
Figure 28B:
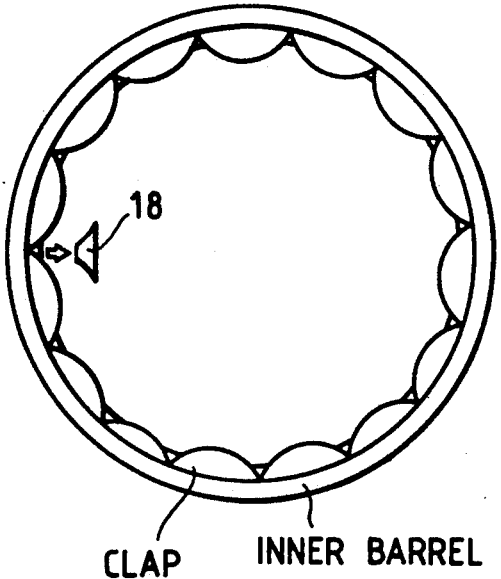

FIGS. 27 and 28 are sectional views of the lens barrel obtained when b—b' section in FIG. 25 is viewed in the arrowed direction. In both figures (a) shows the state before the clap is cut off or folded off, while (b) shows the state in which the clap has been cut off or folded off to enlarge the effective aperture. Thus, by using a clap capable of being cut off or folded off, it is possible to change the brightness without changing the barrel shape.

TABLE 1(A)

| | | | Radius of Curvature $R_D$ | Space Between Faces | Abbe's Number vd / Refractive Index |
|---|---|---|---|---|---|
| Spherical System | Screen | | ∞ | 787.60 | 1.0 |
| | First Lens | $S_1$ | 97.999 | 8.874 | 57.9 / 1.49334 |
| | | $S_2$ | 188.61 | 19.0 | 1.0 |
| | Second Lens | $S_3$ | −189.80 | 9.20 | 57.9 / 1.49334 |
| | | $S_4$ | −160.57 | 0.8223 | 1.0 |
| | Third Lens | $S_5$ | 73.028 | 31.00 | 60.03 / 1.62280 |
| | | $S_6$ | −100.0 | 2.40 | 25.7 / 1.79174 |
| | | $S_7$ | −298.27 | 12.20 | 1.0 |
| | Fourth Lens | $S_8$ | 18188.0 | 9.1432 | 57.9 / 1.49334 |
| | | $S_9$ | −198.57 | 30.906 | 1.0 |
| | Fifth Lens | $S_{10}$ | −52.60 | 3.4048 | 57.9 / 1.49334 |
| | | $S_{11}$ | −50.774 | 12.00 | 1.44464 |
| Transparent Medium | | | ∞ | | |
| CRT Panel | Face Surface | | | 13.40 | 1.53983 |
| | Fluorescent Face $P_1$ | | −341.28 | | |

TABLE 1(B)

| | | | CC | AE | AF | AG | AH |
|---|---|---|---|---|---|---|---|
| Aspherical System | First Lens | $S_1$ | −22.091248 | $7.1452882 \times 10^{-7}$ | $-1.6251140 \times 10^{-9}$ | $4.8222738 \times 10^{-13}$ | $-4.2599762 \times 10^{-17}$ |
| | | $S_2$ | 2.1841469 | $-1.3045701 \times 10^{-6}$ | $4.1991921 \times 10^{-10}$ | $-1.8164626 \times 10^{-13}$ | $3.6866791 \times 10^{-17}$ |
| | Second Lens | $S_3$ | 11.628045 | $2.2424447 \times 10^{-6}$ | $7.126260 \times 10^{-10}$ | $-2.9057843 \times 10^{-13}$ | $3.4258433 \times 10^{-17}$ |
| | | $S_4$ | 7.8451805 | $1.8531955 \times 10^{-6}$ | $9.786584 \times 10^{-11}$ | $-9.7439316 \times 10^{-15}$ | $-7.0563651 \times 10^{-18}$ |
| | Fourth Lens | $S_8$ | 198426.56 | $-9.8303516 \times 10^{-9}$ | $-3.2923198 \times 10^{-10}$ | $2.0638499 \times 10^{-13}$ | $-1.8752912 \times 10^{-17}$ |
| | | $S_9$ | 10.558845 | $8.3145824 \times 10^{-7}$ | $3.0054714 \times 10^{-10}$ | $-1.7884294 \times 10^{-13}$ | $1.7736483 \times 10^{-16}$ |
| | Fifth Lens | $S_{10}$ | −0.93910939 | $-3.6342744 \times 10^{-6}$ | $1.6067425 \times 10^{-9}$ | $-1.0267507 \times 10^{-12}$ | $1.7319606 \times 10^{-16}$ |
| | | $S_{11}$ | 0 | 0 | 0 | 0 | 0 |
| | Fluorescent Face $P_1$ | | 4.5813494 | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 2(A)

|  |  |  | Radius of Curvature $R_D$ | Space Between Faces | Abbe's Number $vd$ / Refractive Index |
|---|---|---|---|---|---|
| Spherical System | Screen |  | ∞ | 778.5 | 1.0 |
|  | First Lens | $S_1$ | 92.857 | 9.0 | 57.9 / 1.49345 |
|  |  | $S_2$ | 134.27 | 39.0 | 1.0 |
|  | Second Lens | $S_3$ | 76.780 | 21.0 | 61.3 / 1.59149 |
|  |  | $S_4$ | −309.25 | 21.5 | 1.0 |
|  | Third Lens | $S_5$ | 413.78 | 8.0 | 57.9 / 1.49345 |
|  |  | $S_6$ | −165.41 | 32.546 | 1.0 |
|  | Fourth Lens | $S_7$ | −50.924 | 3.4048 | 57.9 / 1.49345 |
|  |  | $S_8$ | −50.774 | 12.00 | 1.44473 |
|  | Transparent Medium |  | ∞ |  |  |
|  | CRT Panel | Face Surface |  | 13.40 | 1.53994 |
|  |  | Fluorescent Face $P_1$ | −341.28 |  |  |

TABLE 3(A)

|  |  |  | Radius of Curvature $R_D$ | Space Between Faces | Abbe's Number $vd$ / Refractive Index |
|---|---|---|---|---|---|
| Spherical System | Screen |  | ∞ | 790.0 | 1.0 |
|  | First Lens | $S_1$ | 90.538 | 8.874 | 30.3 / 1.58890 |
|  |  | $S_2$ | 132.56 | 18.890 | 1.0 |
|  | Second Lens | $S_3$ | −395.96 | 9.5 | 57.9 / 1.49334 |
|  |  | $S_4$ | −121.26 | 0.5 | 1.0 |
|  | Third Lens | $S_5$ | 80.340 | 28.5 | 60.3 / 1.62280 |
|  |  | $S_6$ | −7000.0 | 12.692 | 1.0 |
|  | Fourth Lens | $S_7$ | 409.26 | 7.2957 | 57.9 / 1.49334 |
|  |  | $S_8$ | −305.62 | 27.836 | 1.0 |
|  | Fifth Lens | $S_9$ | −52.317 | 3.3421 | 57.9 / 1.49334 |
|  |  | $S_{10}$ | −50.132 | 12.00 | 1.44464 |
|  | Transparent Medium |  | ∞ |  |  |
|  | CRT Panel | Face Surface |  | 13.4 | 1.53983 |
|  |  | Fluorescent Face $P_1$ | −341.28 |  |  |

TABLE 2(B)

|  |  |  | CC | AE | AF | AG | AH |
|---|---|---|---|---|---|---|---|
| Aspherical System | First Lens | $S_1$ | −1.1641588 | $1.4528285 \times 10^{-7}$ | $-3.1447001 \times 10^{-10}$ | $5.4649631 \times 10^{-14}$ | $5.8785782 \times 10^{-19}$ |
|  |  | $S_2$ | 4.3103714 | $8.7222134 \times 10^{-8}$ | $-2.4314661 \times 10^{-10}$ | $3.7769396 \times 10^{-14}$ | $3.1237086 \times 10^{-18}$ |
|  | Third Lens | $S_5$ | −27.918533 | $-1.5742370 \times 10^{-7}$ | $3.5476133 \times 10^{-10}$ | $2.5419564 \times 10^{-13}$ | $-1.1244196 \times 10^{-16}$ |
|  |  | $S_6$ | 12.823207 | $8.5459834 \times 10^{-7}$ | $2.9324099 \times 10^{-10}$ | $5.6273503 \times 10^{-13}$ | $-1.5608238 \times 10^{-16}$ |
|  | Fourth Lens | $S_7$ | 0.39626831 | $-7.2942424 \times 10^{-7}$ | $1.0023198 \times 10^{-9}$ | $-3.4842929 \times 10^{-13}$ | $9.8013676 \times 10^{-17}$ |
|  |  | $S_8$ | 0.0 | 0.0 | 0.0 | 0.0 | 0.0 |
|  | Fluorescent Face $P_1$ |  | 4.5813494 | $-2.3355796 \times 10^{-7}$ | $1.1824200 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 3(B)

|  |  |  | CC | AE | AF | AG | AH |
|---|---|---|---|---|---|---|---|
| Aspherical System | First Lens | $S_1$ | −16.197183 | $1.1491170 \times 10^{-6}$ | $-2.4727174 \times 10^{-9}$ | $8.1388013 \times 10^{-13}$ | $-8.0439262 \times 10^{-17}$ |
|  |  | $S_2$ | 5.1115932 | $-8.8967122 \times 10^{-7}$ | $-8.8755521 \times 10^{-10}$ | $4.2184259 \times 10^{-13}$ | $-6.7878695 \times 10^{-17}$ |
|  | Second Lens | $S_3$ | 34.294391 | $1.2839024 \times 10^{-6}$ | $5.5437765 \times 10^{-10}$ | $-1.2751304 \times 10^{-13}$ | $-4.5822250 \times 10^{-18}$ |
|  |  | $S_4$ | −1.2040746 | $5.7451963 \times 10^{-7}$ | $-9.2368711 \times 10^{-11}$ | $1.4119760 \times 10^{-13}$ | $-3.8408993 \times 10^{-17}$ |
|  | Fourth Lens | $S_7$ | −124.71466 | $1.4982927 \times 10^{-6}$ | $-2.4047198 \times 10^{-10}$ | $1.0682642 \times 10^{-12}$ | $-6.6120374 \times 10^{-16}$ |
|  |  | $S_8$ | −34.169188 | $2.1471051 \times 10^{-6}$ | $-1.3431777 \times 10^{-11}$ | $1.2647815 \times 10^{-13}$ | $-6.7387725 \times 10^{-16}$ |
|  | Fifth Lens | $S_9$ | 0.44327094 | $-2.1713278 \times 10^{-6}$ | $1.9994730 \times 10^{-9}$ | $-1.4895256 \times 10^{-12}$ | $6.0904636 \times 10^{-16}$ |
|  |  | $S_{10}$ | 0 | 0 | 0 | 0 | 0 |
|  | Fluorescent |  | 4.5813494 | $-2.3355796 \times 10^{-7}$ | $1.182420 \times 10^{-10}$ | $-1.4486896 \times 10^{-14}$ | $5.5873481 \times 10^{-19}$ |

TABLE 3(B)-continued

| | CC | AE | AF | AG | AH |
|---|---|---|---|---|---|
| Face $P_1$ | | | | | |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 3(C)

| | | | Radius of Curvature $R_D$ | Space Between Faces | Abbe's Number $\nu d$ / Refractive Index |
|---|---|---|---|---|---|
| Spherical System | Screen | | ∞ | 790.0 | 1.0 |
| | First Lens | $S_1$ | 90.538 | 8.874 | 30.3 / 1.58890 |
| | | $S_2$ | 132.56 | 18.89 | 1.0 |
| | Second Lens | $S_3$ | −395.96 | 9.5 | 57.9 / 1.49334 |
| | | $S_4$ | −121.26 | 0.5 | 1.0 |
| | Third Lens | $S_5$ | 80.34 | 27.00 | 60.03 / 1.62280 |
| | | $S_6$ | −75.0 | 1.5 | 36.3 / 1.62399 |
| | | $S_7$ | −7000.0 | 12.692 | 1.0 |
| | Fourth Lens | $S_8$ | 409.26 | 7.2957 | 57.9 / 1.49334 |
| | | $S_9$ | −305.62 | 27.911 | 1.0 |
| | Fifth Lens | $S_{10}$ | −52.317 | 3.3421 | 57.9 / 1.49334 |
| | | $S_{11}$ | −50.132 | 12.00 | 1.44464 |
| Transparent Medium | | | ∞ | | |
| CRT Face Panel | | | | 13.40 | 1.53983 |
| Surface Fluorescent Face $P_1$ | | | −341.28 | | |

TABLE 4(A)

| | | | Radius of Curvature $R_D$ | Space Between Faces | Abbe's Number $\nu d$ / Refractive Index |
|---|---|---|---|---|---|
| Spherical System | Screen | | ∞ | 790.0 | 1.0 |
| | First Lens | $S_1$ | 90.546 | 8.874 | 30.3 / 1.58890 |
| | | $S_2$ | 132.56 | 18.862 | 1.0 |
| | Second Lens | $S_3$ | −404.37 | 9.5 | 57.9 / 1.49334 |
| | | $S_4$ | −119.97 | 0.5 | 1.0 |
| | Third Lens | $S_5$ | 80.340 | 28.5 | 60.3 / 1.62280 |
| | | $S_6$ | ∞ | 12.631 | 1.0 |
| | Fourth Lens | $S_7$ | 413.98 | 7.2957 | 57.9 / 1.49334 |
| | | $S_8$ | −301.02 | 27.696 | 1.0 |
| | Fifth Lens | $S_9$ | −52.122 | 3.3421 | 57.9 / 1.49334 |
| | | $S_{10}$ | −50.132 | 12.00 | 1.44464 |
| Transparent Medium | | | ∞ | | |
| CRT Panel | Face Surface | | | 13.4 | 1.53983 |
| | Fluorescent Face $P_1$ | | −341.28 | | |

TABLE 4(B)

| | | | CC | AE | AF | AG | AH |
|---|---|---|---|---|---|---|---|
| Aspherical System | First Lens | $S_1$ | −16.189407 | $1.1498669 \times 10^{-6}$ | $-2.4753948 \times 10^{-9}$ | $8.1308045 \times 10^{-13}$ | $-8.0043502 \times 10^{-17}$ |
| | | $S_2$ | 5.1602704 | $-8.7814749 \times 10^{-7}$ | $-8.8572238 \times 10^{-10}$ | $4.2383561 \times 10^{-13}$ | $-6.9523697 \times 10^{-17}$ |
| | Second Lens | $S_3$ | 32.446014 | $1.2892306 \times 10^{-6}$ | $5.4255156 \times 10^{-10}$ | $-1.2512788 \times 10^{-13}$ | $-4.4846432 \times 10^{-18}$ |
| | | $S_4$ | −0.97792351 | $5.5951091 \times 10^{-7}$ | $-8.8977145 \times 10^{-11}$ | $1.4001040 \times 10^{-13}$ | $-3.7519788 \times 10^{-17}$ |
| | Fourth Lens | $S_7$ | −8.4842262 | $1.3333137 \times 10^{-6}$ | $-2.5093905 \times 10^{-10}$ | $1.1400195 \times 10^{-12}$ | $-6.9844876 \times 10^{-16}$ |
| | | $S_8$ | −12.595605 | $2.2209970 \times 10^{-6}$ | $1.4163943 \times 10^{-11}$ | $1.2598403 \times 10^{-12}$ | $-6.8300968 \times 10^{-16}$ |
| | Fifth Lens | $S_9$ | 0.43685383 | $-2.2490422 \times 10^{-6}$ | $2.1655113 \times 10^{-9}$ | $-1.6291118 \times 10^{-12}$ | $6.570964 \times 10^{-16}$ |
| | | $S_{10}$ | 0 | 0 | 0 | 0 | 0 |
| | Fluorescent Face $P_1$ | | 4.5813494 | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 4(C)

| | | | Radius of Curvature $R_D$ | Space Between Faces | Abbe's Number $\nu d$ / Refractive Index |
|---|---|---|---|---|---|
| Spherical System | Screen | | ∞ | 790.0 | 1.0 |
| | First Lens | $S_1$ | 90.546 | 8.874 | 30.3 / 1.58890 |
| | | $S_2$ | 132.65 | 18.864 | 1.0 |
| | Second Lens | $S_3$ | −404.37 | 9.5 | 57.9 / 1.49334 |
| | | $S_4$ | −119.97 | 0.5 | 1.0 |

TABLE 4(C)-continued

| | | Radius of Curvature $R_D$ | Space Between Faces | Abbe's Number $vd$ / Refractive Index |
|---|---|---|---|---|
| Third Lens | $S_5$ | 80.340 | 26.5 | 60.03 / 1.62280 |
| | $S_6$ | −75.0 | 2.0 | 36.3 / 1.62399 |
| | $S_7$ | ∞ | 12.631 | 1.0 |

| Fourth Lens | $S_8$ | 413.98 | 7.2957 | 57.9 / 1.49334 |
| | $S_9$ | −301.02 | 27.771 | 1.0 |
| Fifth Lens | $S_{10}$ | −52.122 | 3.3421 | 57.9 / 1.49334 |
| | $S_{11}$ | −50.132 | 12.00 | 1.44464 |
| Transparent Medium | | ∞ | 13.4 | 1.53983 |
| CRT Panel Face Surface Fluorescent Face $P_1$ | | −341.28 | | |

TABLE 5(A)

| | | Radius of Curvature $R_D$ | Space Between Faces | Abbe's Number $vd$ / Refractive Index |
|---|---|---|---|---|
| Spherical System | Screen | ∞ | 790.0 | 1.0 |
| | First Lens $S_1$ | 85.726 | 8.874 | 30.3 / 1.58890 |
| | $S_2$ | 130.12 | 19.715 | 1.0 |
| Second Lens | $S_3$ | −279.36 | 9.5 | 57.9 / 1.49334 |
| | $S_4$ | −114.17 | 0.5 | 1.0 |
| Third Lens | $S_5$ | 72.267 | 30.0 | 60.3 / 1.62280 |
| | $S_6$ | 688.79 | 9.8229 | 1.0 |
| Fourth Lens | $S_7$ | 1341.8 | 7.2957 | 57.9 / 1.49334 |
| | $S_8$ | −203.97 | 27.984 | 1.0 |
| Fifth Lens | $S_9$ | −54.749 | 3.3421 | 57.9 / 1.49334 |
| | $S_{10}$ | −50.132 | 12.00 | 1.44464 |
| Transparent Medium | | ∞ | 13.4 | 1.53983 |
| CRT Panel Face Surface Fluorescent Face $P_1$ | | −341.28 | | |

TABLE 5(B)

| | | | CC | AE | AF | AG | AH |
|---|---|---|---|---|---|---|---|
| Aspherical System | First Lens | $S_1$ | −15.26860 | $1.1259281 \times 10^{-6}$ | $-2.5413804 \times 10^{-9}$ | $8.2202431 \times 10^{-13}$ | $-7.7196306 \times 10^{-17}$ |
| | | $S_2$ | 4.9164934 | $-1.3574354 \times 10^{-6}$ | $-7.591547 \times 10^{-10}$ | $3.8837835 \times 10^{-13}$ | $-6.4454178 \times 10^{-17}$ |
| | Second Lens | $S_3$ | 21.130920 | $1.2714318 \times 10^{-6}$ | $7.8633122 \times 10^{-10}$ | $-1.4432715 \times 10^{-13}$ | $-1.1645212 \times 10^{-17}$ |
| | | $S_4$ | −0.87876731 | $6.5197048 \times 10^{-7}$ | $6.4518405 \times 10^{-11}$ | $1.2614812 \times 10^{-13}$ | $-4.7224879 \times 10^{-17}$ |
| | Fourth Lens | $S_7$ | −9829.5977 | $9.3400439 \times 10^{-7}$ | $1.3492410 \times 10^{-10}$ | $5.9239457 \times 10^{-13}$ | $-4.5415641 \times 10^{-16}$ |
| | | $S_8$ | −14.516611 | $1.9059871 \times 10^{-6}$ | $2.5723243 \times 10^{-11}$ | $1.2099115 \times 10^{-12}$ | $-5.7567451 \times 10^{-16}$ |
| | Fifth Lens | $S_9$ | 0.36361086 | $-1.7202501 \times 10^{-6}$ | $5.6167071 \times 10^{-10}$ | $-3.2185019 \times 10^{-13}$ | $1.6191711 \times 10^{-16}$ |
| | | $S_{10}$ | 0 | 0 | 0 | 0 | 0 |
| | Fluorescent Face $P_1$ | | 4.5813494 | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 5(C)

| | | Radius of Curvature $R_D$ | Space Between Faces | Abbe's Number $vd$ / Refractive Index |
|---|---|---|---|---|
| Spherical System | Screen | ∞ | 790.0 | 1.0 |
| | First Lens $S_1$ | 85.726 | 8.874 | 30.3 / 1.58890 |
| | $S_2$ | 130.12 | 19.715 | 1.0 |
| Second Lens | $S_3$ | −279.36 | 9.5 | 57.9 / 1.49334 |
| | $S_4$ | −114.17 | 0.5 | 1.0 |
| Third Lens | $S_5$ | 72.267 | 28.5 | 60.3 / 1.62280 |
| | $S_6$ | −75.0 | 1.5 | 36.3 / 1.62399 |
| | $S_7$ | 688.79 | 9.8227 | 1.0 |
| Fourth Lens | $S_8$ | 1341.8 | 7.2957 | 57.9 / 1.49334 |
| | $S_9$ | −203.97 | 27.984 | 1.0 |
| Fifth Lens | $S_{10}$ | −54.748 | 3.3421 | 57.9 / 1.49334 |
| | $S_{11}$ | −50.132 | 12.00 | 1.44464 |
| Transparent Medium | | ∞ | 13.4 | 1.53983 |
| CRT Panel Face Surface Fluorescent Face $P_1$ | | −341.28 | | |

TABLE 6(A)

| | | | Radius of Curvature $R_D$ | Space Between Faces | Abbe's Number $\nu d$ / Refractive Index |
|---|---|---|---|---|---|
| Spherical System | Screen | | ∞ | 790.0 | 1.0 |
| | First Lens | $S_1$ | 99.371 | 8.874 | 30.3 / 1.58890 |
| | | $S_2$ | 135.02 | 18.997 | 1.0 |
| | Second Lens | $S_3$ | −271.78 | 9.5 | 57.9 / 1.49334 |
| | | $S_4$ | −176.11 | 0.5 | 1.0 |
| | Third Lens | $S_5$ | 73.877 | 30.0 | 60.3 / 1.62280 |
| | | $S_6$ | −78.00 | 2.5 | 25.7 / 1.79174 |
| | | $S_7$ | −205.90 | 13.3 | 1.0 |
| | Fourth Lens | $S_8$ | 516.05 | 7.2957 | 57.9 / 1.49334 |
| | | $S_9$ | −294.53 | 30.113 | 1.0 |
| | Fifth Lens | $S_{10}$ | −51.543 | 3.3421 | 57.9 / 1.49334 |
| | Transparent Medium | $S_{11}$ | −50.132 | 12.00 | 1.44464 |
| | | | ∞ | 13.4 | 1.53983 |
| | CRT Panel Face Surface Fluorescent Face $P_1$ | | −341.28 | | |

TABLE 7(A)

| | | | Radius of Curvature $R_D$ | Space Between Faces | Abbe's Number $\nu d$ / Refractive Index |
|---|---|---|---|---|---|
| Spherical System | Screen | | ∞ | 790.0 | 1.0 |
| | First Lens | $S_1$ | 92.496 | 8.2061 | 30.3 / 1.58890 |
| | | $S_2$ | 140.26 | 12.697 | 1.0 |
| | Second Lens | $S_3$ | −407.37 | 11.749 | 57.9 / 1.49334 |
| | | $S_4$ | −322.90 | 0.5 | 1.0 |
| | Third Lens | $S_5$ | 95.176 | 21.675 | 60.3 / 1.62280 |
| | | $S_6$ | −172.61 | 21.843 | 1.0 |
| | Fourth Lens | $S_7$ | 1127.8 | 7.2957 | 57.9 / 1.49334 |
| | | $S_8$ | −151.78 | 27.984 | 1.0 |
| | Fifth Lens | $S_9$ | −51.543 | 3.3421 | 57.9 / 1.49334 |
| | Transparent Medium | $S_{10}$ | −50.132 | 12.00 | 1.44464 |
| | | | ∞ | 13.4 | 1.53983 |
| | CRT Panel Face Surface Fluorescent Face $P_1$ | | −341.28 | | |

TABLE 6(B)

| | | | CC | AE | AF | AG | AH |
|---|---|---|---|---|---|---|---|
| Aspherical System | First Lens | $S_1$ | −17.822083 | $9.6200438 \times 10^{-7}$ | $-2.2860192 \times 10^{-9}$ | $7.5216228 \times 10^{-13}$ | $-7.5183611 \times 10^{-17}$ |
| | | $S_2$ | 4.3537569 | $-8.8163574 \times 10^{-7}$ | $-9.8732666 \times 10^{-10}$ | $3.8056613 \times 10^{-13}$ | $-4.1792963 \times 10^{-17}$ |
| | Second Lens | $S_3$ | −56.912933 | $1.4778507 \times 10^{-6}$ | $2.1591005 \times 10^{-10}$ | $-4.7389959 \times 10^{-14}$ | $-1.5920805 \times 10^{-17}$ |
| | | $S_4$ | −23.624878 | $8.2483166 \times 10^{-7}$ | $-4.2019499 \times 10^{-11}$ | $1.1675746 \times 10^{-13}$ | $-4.8150963 \times 10^{-17}$ |
| | Fourth Lens | $S_8$ | 157.41711 | $4.0271578 \times 10^{-7}$ | $1.3190580 \times 10^{-11}$ | $-1.4982471 \times 10^{-13}$ | $4.1693026 \times 10^{-17}$ |
| | | $S_9$ | −27.295013 | $9.4030571 \times 10^{-7}$ | $4.5176818 \times 10^{-10}$ | $-3.5836557 \times 10^{-13}$ | $1.5429416 \times 10^{-16}$ |
| | Fifth Lens | $S_{10}$ | 0.53007919 | $-3.4957948 \times 10^{-6}$ | $3.5448675 \times 10^{-9}$ | $-2.3173867 \times 10^{-12}$ | $7.1377370 \times 10^{-16}$ |
| | | $S_{11}$ | 0 | 0 | 0 | 0 | 0 |
| | Fluorescent Face $P_1$ | | 4.5813494 | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 7(B)

| | | | CC | AE | AF | AG | AH |
|---|---|---|---|---|---|---|---|
| Aspherical System | First Lens | $S_1$ | −14.252677 | $8.9568914 \times 10^{-7}$ | $-2.1814219 \times 10^{-9}$ | $7.7891290 \times 10^{-13}$ | $-9.2050459 \times 10^{-17}$ |
| | | $S_2$ | 5.9230633 | $-7.8229976 \times 10^{-7}$ | $-8.0139340 \times 10^{-10}$ | $5.5336996 \times 10^{-13}$ | $-1.288945 \times 10^{-16}$ |
| | Second Lens | $S_3$ | −18.355804 | $7.0309511 \times 10^{-7}$ | $4.1546167 \times 10^{-10}$ | $2.8583947 \times 10^{-14}$ | $-1.0394242 \times 10^{-16}$ |
| | | $S_4$ | −17.095596 | $2.6480564 \times 10^{-7}$ | $-3.5712502 \times 10^{-11}$ | $6.2280096 \times 10^{-14}$ | $-5.2936423 \times 10^{-17}$ |
| | Fourth Lens | $S_7$ | 768.32666 | $-1.7966119 \times 10^{-7}$ | $3.8129366 \times 10^{-10}$ | $9.3625872 \times 10^{-15}$ | $1.6871918 \times 10^{-16}$ |
| | | $S_8$ | −21.525909 | $-3.2374192 \times 10^{-7}$ | $7.2176332 \times 10^{-10}$ | $-1.1933054 \times 10^{-13}$ | $2.5380283 \times 10^{-16}$ |
| | Fifth Lens | $S_9$ | 0.53007919 | $-3.4957948 \times 10^{-6}$ | $3.5448675 \times 10^{-9}$ | $-2.3173867 \times 10^{-12}$ | $7.1377370 \times 10^{-16}$ |
| | | $S_{10}$ | 0 | 0 | 0 | 0 | 0 |
| | Fluorescent Face $P_1$ | | 4.5813494 | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)r^2/R_D^2}} + AE \cdot r^4 + AF \cdot r^6 + AG \cdot r^8 + AH \cdot r^{10}$$

TABLE 8

| Lens No. | Power Distribution of Constituent Lenses | | | | | Focal Length of Entire System |
|---|---|---|---|---|---|---|
| | $f_0/f_1$ | $f_0/f_2$ | $f_0/f_3$ | $f_0/f_4$ | $f_0/f_5$ | $f_0$ (m) |
| 1 | 0.2153 | 0.0450 | 0.8029 | 0.2166 | −0.5655 | 86.24 |
| 3 (A) | 0.1826 | 0.2345 | 0.6430 | 0.2308 | −0.5417 | 82.13 |
| (C) | 0.1827 | 0.2346 | 0.6423 | 0.2309 | −0.5420 | 82.18 |
| 4 (A) | 0.1829 | 0.2403 | 0.6371 | 0.2318 | −0.5499 | 82.18 |
| (C) | 0.1830 | 0.2403 | 0.6363 | 0.2320 | −0.5452 | 82.23 |
| 5 (A) | 0.2058 | 0.2128 | 0.6423 | 0.2274 | −0.5060 | 81.74 |
| (C) | 0.2065 | 0.2135 | 0.6434 | 0.2282 | −0.5078 | 82.02 |
| 6 | 0.1439 | 0.0857 | 0.8262 | 0.2209 | −0.5669 | 84.20 |
| 7 | 0.1893 | 0.0272 | 0.8073 | 0.3021 | −0.5526 | 82.08 |

$f_1$: Focal length of the first group
$f_2$: Focal length of the second group
$f_3$: Focal length of the third group
$f_4$: Focal length of the fourth group
$f_5$: Focal length of the fifth group

TABLE 9

| | | Lens No. | Amount of Sag in Aspherical System (mm):$A_s$ | Amount of Sag in Spherical System (mm):$S_s$ | $A_s/S_s$ | Clap Radius (mm) |
|---|---|---|---|---|---|---|
| First Lens | Image-side Lens Surface $S_1$ | 1 | −0.9715 | 17.5764 | −0.0553 | 56.0 |
| | | 3 | 0.6670 | 15.0587 | 0.0443 | 50.0 |
| | | 4 | 0.6382 | 15.0571 | 0.0424 | 50.0 |
| | | 5 | 0.4280 | 16.0916 | 0.0266 | 50.0 |
| | | 6 | −1.0956 | 15.3139 | −0.0715 | 53.0 |
| | | 7 | 0.2798 | 16.6903 | 0.0168 | 53.0 |
| | Image-side Lens Surface $S_2$ | 1 | 2.1481 | 7.6292 | 0.2816 | 53.1 |
| | | 3 | 3.9249 | 8.9958 | 0.4363 | 48.0 |
| | | 4 | 3.9999 | 8.9894 | 0.4450 | 48.0 |
| | | 5 | 2.5527 | 9.1770 | 0.2782 | 48.0 |
| | | 6 | 2.0852 | 10.2076 | 0.2043 | 51.5 |
| | | 7 | 5.0409 | 9.7969 | 0.5145 | 51.5 |

TABLE 10

| | | Lens No. | Amount of Sag in Aspherical System (mm):$A_s$ | Amount of Sag in Spherical System (mm):$S_s$ | $A_s/S_s$ | Clap Radius (mm) |
|---|---|---|---|---|---|---|
| Second Lens | Image-side Lens Surface $S_3$ | 1 | 5.9159 | −6.0399 | −0.9795 | 47.5 |
| | | 3 | 2.4288 | −2.0256 | −1.1991 | 40.0 |
| | | 4 | 2.4819 | −1.9832 | −1.2515 | 40.0 |
| | | 5 | 2.1144 | −2.8785 | −0.7345 | 40.0 |
| | | 6 | 4.1429 | −3.9555 | −1.0474 | 46.2 |
| | | 7 | −0.1480 | −2.9215 | 0.0507 | 48.7 |
| | Image-side Lens Surface $S_4$ | 1 | 0.5107 | −7.4365 | −0.0687 | 48.3 |
| | | 3 | −4.9460 | −6.7872 | 0.7287 | 40.0 |
| | | 4 | −5.0804 | −6.8648 | 0.7401 | 40.0 |
| | | 5 | −4.7685 | −7.2364 | 0.6590 | 40.0 |
| | | 6 | −1.0727 | −5.9792 | 0.1794 | 45.5 |
| | | 7 | −4.2128 | −3.6480 | 1.1548 | 48.4 |

TABLE 11

| | | Lens No. | Amount of Sag in Aspherical System (mm):$A_s$ | Amount of Sag in Spherical System (mm):$S_s$ | $A_s/S_s$ | Clap Radius (mm) |
|---|---|---|---|---|---|---|
| Fourth Lens | Image-side Lens Surface | 1 | −0.1445 | 0.044 | −3.2841 | 40.0 |
| | | 3 | 4.4821 | 1.8817 | 2.3819 | 39.2 |
| | | 4 | 4.4354 | 1.8601 | 2.3845 | 39.2 |
| | | 5 | 2.3887 | 0.5727 | 4.1709 | 39.2 |
| | | 6 | 2.8234 | 1.4910 | 1.8936 | 39.2 |
| | | 7 | 3.5335 | 0.6815 | 5.1849 | 39.2 |

TABLE 11-continued

| | Lens No. | Amount of Sag in Aspherical System (mm):$A_s$ | Amount of Sag in Spherical System (mm):$S_s$ | $A_s/S_s$ | Clap Radius (mm) |
|---|---|---|---|---|---|
| $S_8$ Image-side Lens Surface $S_9$ | 1 | −0.8092 | −3.9481 | 0.2050 | 39.4 |
| | 3 | 3.8666 | −2.4601 | −1.5717 | 38.7 |
| | 4 | 3.8427 | −2.4981 | −1.5382 | 38.7 |
| | 5 | 2.8026 | −3.7050 | −0.7564 | 38.7 |
| | 6 | 0.6812 | −2.5536 | −0.2668 | 38.7 |
| | 7 | −0.8928 | −5.0167 | 0.1780 | 38.7 |

TABLE 12

| Lens No. | Focal Length of Entire System :$f_0$ (mm) | Lens Spacing :$l_{23}$ (mm) | Lens Spacing :$l_{45}$ (mm) | $l_{23}/f_0$ | $l_{23}/l_{45}$ |
|---|---|---|---|---|---|
| 1 | 86.24 | 19.00 | 0.8223 | 0.2203 | 23.106 |
| 3 | 82.13 | 18.890 | 0.5 | 0.2300 | 37.78 |
| 4 | 82.18 | 18.862 | 0.5 | 0.2295 | 37.724 |
| 5 | 81.74 | 19.715 | 0.5 | 0.2412 | 39.43 |
| 6 | 84.20 | 18.997 | 0.5 | 0.2256 | 37.994 |
| 7 | 82.08 | 12.697 | 0.5 | 0.1547 | 25.394 |

$l_{23}$: Space between faces of the first and second group constituent lenses.
$l_{45}$: Space between faces of the second and third group constituent lenses.

TABLE 13

| Lens No. | Spacing :$L_0$ (mm) | Lens Spacing :$l_{78}$ (mm) | Lens Spacing :$l_{910}$ (mm) | $l_{910}/L_0$ | $l_{78}/l_{910}$ |
|---|---|---|---|---|---|
| 1 | 81.05 | 12.20 | 30.906 | 0.3813 | 0.3947 |
| 3 | 76.57 | 12.692 | 27.836 | 0.3635 | 0.4560 |
| 4 | 76.36 | 12.631 | 27.696 | 0.3627 | 0.4561 |
| 5 | 77.84 | 9.8229 | 27.984 | 0.3790 | 0.3510 |
| 6 | 79.45 | 13.30 | 30.113 | 0.3790 | 0.4417 |
| 7 | 85.86 | 21.843 | 27.984 | 0.3259 | 0.7806 |

$l_{78}$: Space between faces of the third and fourth group constituent lenses.
$l_{910}$: Space between faces of the fourth and fifth group constituent lenses.
$L_0$: Space between faces of the fluorescent face and the third group constituent lens.

We claim:

1. A color image display device comprising:
   red, green and blue image producing means for producing red, green and blue color images, respectively;
   a screen; and
   individual projection means for respectively projecting red, green and blue, said projection means projecting images produced by said red, green and blue image producing means respectively onto said screen,
   said projection means for green having a focus characteristic higher than the focus characteristic of said projection means for blue and for red when green light is projected therethrough.

2. A color image display device according to claim 1, wherein said projection means for green includes a cemented convex doublet consisting of a convex lens and a concave lens.

3. A color image display device according to claim 1, wherein the number of lenses of said projection means for green is larger than that of said projection means for red.

4. A color image display device comprising:
   red, green and blue image producing means for producing red, green and blue color images, respectively;

a screen; and individual projection means for respectively projecting red, green and blue, said projection means projecting images produced by said red, green and blue image producing means respectively onto said screen, the quantity of light projected by said projection means for blue being larger than that projected by said projection means for red and green.

5. A color image display device according to claim 4, wherein an effective lens aperture of said projection means for blue is larger than that of said projection means for red and green.

6. A projection lens system comprising, successively from a screen side;

a first group including a lens convex on the screen side and having a surface which is convex at its central portion and concave at its peripheral portion with respect to the screen;

a second group including a lens having a relatively weak refractive power;

a third group having a positive refractive force the most of the entire system;

a fourth group including a lens having a relatively weak refractive power; and a fifth group including a negative lens having a concave surface on the screen side.

7. A projection lens system comprising, successively from a screen side:

a first group including a lens convex on the screen side and having a surface which is convex at its central portion and concave at its peripheral portion with respect to the screen;

a second group including a lens having a relatively weak refractive power;

a third group having a positive refractive power for the most of the entire system;

a fourth group including a lens having a relatively weak refractive power; and a fifth group including a negative lens having a concave surface on the screen side, said projection lens system satisfying the following conditions:

$0.14 < f_0/f_1 < 0.22$ $0.02 < f_0/f_2 < 0.25$ $0.63 < f_0/f_3 < 0.83$ $0.21 < f_0/f_4 < 0.31$ $-0.57 < f_0/f_5 < -0.50$ where
$f_0$: focal length of the entire lens system
$f_1$: focal length of the first lens group
$f_2$: focal length of the second lens group
$f_3$: focal length of the third lens group
$f_4$: focal length of the fourth lens group
$f_5$: focal length of the fifth lens group 8. A projection lens system according to claim 7, wherein the constituent lens elements of said first, second, fourth and fifth groups are aspherical at least at one surfaces thereof.

9. A projection lens system according to claim 7, wherein the screen-side lens surface of at least one constituent lens element of said first group has an amount of asphericity which satisfies the following relation, provided the amount of asphericity is assumed to be $A_s/S_s$:

$-0.1 < A_s/S_s$ $A_s$: amount of aspherical sag
$S_s$: amount of spherical sag

10. A projection lens system according to claim 7, wherein the second group-side lens surface of at least one constituent lens of said first group has an amount of asphericity which satisfies the following relation, provided the amount of asphericity is assumed to be $A_s/S_s$:

$0.2 < A_s/S_s$ $A_s$: amount of aspherical sag
$S_s$: amount of spherical sag

11. A protection lens system according to claim 7, wherein the first group-side lens surface of at least one constituent lens of said second group has an amount of asphericity which satisfies the following relation, provided the amount of asphericity is assumed to be $A_s/S_s$:

$-1.3 < A_s/S_s$ $A_s$: amount of aspherical sag
$S_s$: amount of spherical sag

12. A projection lens system according to claim 7, wherein the third group-side lens surface of at least one constituent lens element of said second group has an amount of asphericity which satisfies the following relation, provided the amount of asphericity is assumed to be $A_s/S_s$:

$-0.1 < A_s/S_s$ $A_s$: amount of aspherical sag
$S_s$: amount of spherical sag

13. A projection lens system according to claim 7, wherein the third group-side lens surface of at least one constituent lens of said fourth group has an amount of asphericity which satisfies the following relation, provided the amount of asphericity is assumed to be $A_s/S_s$:

$-3.3 < A_s/S_s$ $A_s$: amount of aspherical sag
$S_s$: amount of spherical sag

14. A projection lens system according to claim 7, wherein the fifth group-side lens surface of at least one constituent lens of said fourth group has an amount of asphericity which satisfies the following relation, provided the amount of asphericity is assumed to be $A_s/S_s$:

$-1.6 < A_s/S_s$ $A_s$: amount of aspherical sag
$S_s$: amount of spherical sag

15. A projection lens system according to claim 7, wherein the space between faces $l_{23}$, of the constituent lenses of said first and second groups has the following relation to a focal length $f_0$, of the entire lens system:

$0.15 < l_{23}/f_0$

16. A projection lens system according to claim 7, wherein the ratio $l_{23}/l_{45}$ of the space between faces of the constituent lenses of said first and second groups to the space between faces $l_{45}$, of the constituent lenses of said second and third groups has the following relation:

$$20 < l_{23}/l_{45}$$

17. A projection lens system according to claim 7, wherein the ratio $l_{910}/L_0$ of the space between faces $l_{910}$, of the constituent lenses of said fourth and fifth groups to the space between faces $L_0$, of the fluorescent face of a cathode-ray tube which constitutes said fifth group and the constituent lens of said third group has the following relation:

$$l_{910}/L_0 < 0.40$$

18. A projection lens system according to claim 7, wherein the ratio $l_{78}/l_{910}$ of the space between faces $l_{78}$, of the constituent lenses of said third and fourth groups to the space between faces $l_{910}$, of the constituent lenses of said fourth and fifth groups has the following relation:

$$0.3 < l_{78}/l_{910}$$

19. A projection lens system comprising, successively from a screen side:
   a first group including a lens convex on the screen side and having a surface which is convex at its central portion and concave at its peripheral portion with respect to the screen;
   a second group including a lens having a relatively weak refractive power;
   a third group having a positive refractive power for the most of the entire system;
   a fourth group including a lens having a relatively weak refractive power; and
   a fifth group including a negative lens having a concave surface on the screen side,
   the lens having the strongest positive refractive power being constituted by a cemented doublet comprising a concave lens of a high dispersion material having an Abbe's number "$_d$, of not larger than 45 and a convex lens of a low dispersion material having an Abbe's number "$_d$, of not smaller than 55.

20. A protection lens system according to claim 19, wherein both surfaces of said cemented doublet having the strongest positive refractive power out of the constituent lenses of said third group having a radius of curvature which satisfies the following condition:

$$|r_1| < |r_3|$$

where,
   $r_1$: radius of curvature of the second groupside lens surface
   $r_3$: radius of curvature of the fourth groupside lens surface.

21. A projection lens system according to claim 20, wherein the lens having the strongest positive refractive power is a flat-convex or convex meniscus lens having a convex surface on the second group side.

22. A projection lens system according to claim 19, wherein said first, second, fourth and fifth groups each include an aspherical lens.

23. A projection lens system according to claim 22, wherein the screen-side surface of at least one of the constituent lenses of said second group has an aspherical shape which exhibits a stronger light converging action at the peripheral portion than at the central portion of the lens.

24. A projection lens system according to claim 19, wherein a concave lens is provided on the fourth group side of the cemented doublet which constitutes the third group.

25. A projection lens system according to claim 24, wherein both surfaces of the concave lens of said cemented doublet have a radius of curvature which satisfies the following condition:

$$|r_3| > |r_2|$$

where,
   $r_2$: radius of curvature of the cemented surface
   $r_3$: radius of curvature of the fourth groupside lens surface.

26. A projection lens system according to 24, wherein both surfaces of the convex lens of said cemented doublet have a radius of curvature which satisfies the following condition:

$$|r_2| > |r_1|$$

where, p1 $r_1$: radius of curvature of the second groupside lens surface
   $r_2$: radius of curvature of the cemented surface.

27. A projection lens system according to claim 24, wherein the surfaces of said cemented doublet have a radius of curvature which satisfies the following condition:

$$|r_3| > |r_2| > |r_1|$$

where,
   $r_3$: radius of curvature of the fourth groupside lens surface
   $r_2$: radius of curvature of the cemented surface.
   $r_1$: radius of curvature of the second groupside lens Surface.

28. A projection lens system according to claim 6, wherein said fifth group comprises a negative lens having a concave surface on the screen side and a fluorescent face glass having a convex surface on an electron gun side.

29. A projection lens system according to claim 28, wherein said fluorescent face glass which constitutes the fifth group is of a shape having a center of curvature on the screen side and having a radius of curvature which is larger at the peripheral portion than at the central portion.

30. A color image display device comprising:
   a red, green and blue image producing means for producing red, green and blue color images, respectively;
   a screen; and
   individual projection means for respectively projecting red, green and blue, said projection means projecting images produced by said red, green and blue image producing means respectively onto said screen,
   said projection means for green having a focus characteristic higher than the focus characteristics of said projection means for blue and for red when green light is projected therethrough,
   wherein said plurality of projection means is a projection lens system including successively from a screen side;

a first group including a lens convex on the screen side and having a surface which is convex at its central portion and concave at its peripheral portion with respect to the screen;

a second group including a lens having a relatively weak refractive power;

a third group having a positive refractive force for most of the entire projection lens system;

a fourth group including a lens having a relatively weak refractive power; and a fifth group including a negative lens having a concave surface on the screen side.

31. A color image display device comprising:

red, green and blue image producing means for producing red, green and blue color images, respectively;

a screen; and individual projection means for respectively projecting red, green and blue, said projection means projecting images produced by said red, green and blue image producing means respectively onto said screen, said projection means for green providing a modulation transfer function characteristic which at least approximates a modulation transfer function characteristic for said projection means for red and which is higher than a modulation transfer function characteristic for said projection means for blue.

32. A color image display device according to claim 31, wherein said projection means for green includes a cemented convex doublet consisting of a convex lens and a concave lens.

33. A color image display device according to claim 31, wherein the number of lenses of said projection means for green is larger than that of said projection means for red.

34. A color image display device comprising:

red, green and blue image producing means for producing red, green and blue images, respectively;

a screen; and individual projection means for respectively projecting red, green and blue, said projection means projecting images produced by said red, green and blue image producing means, respectively, onto said screen; and means for increasing the quantity of light projected by said projection means for blue without decreasing the quantity of light projected by said projection means for green and red and enabling an increase in overall luminosity of the color image display device.

35. A color image display device according to claim 34, wherein the means for increasing the quantity of light projected by said projection means for blue enables an increase substantially equal to the quantity of light projected by said projection means for green.

36. A color image display device according to claim 34, wherein the means for increasing quantity of the light projected by said projection means for blue without decreasing the quantity of light projected by said projection means for green and red includes providing the projection means for blue with a smaller F number than said projection means for green and red.

* * * * *